US012627966B2

(12) United States Patent
Kim et al.

(10) Patent No.: US 12,627,966 B2
(45) Date of Patent: May 12, 2026

(54) ELECTRONIC DEVICE SUPPORTING PLURALITY OF SIMS AND OPERATING METHOD THEREFOR

(71) Applicant: Samsung Electronics Co., Ltd., Suwon-si (KR)

(72) Inventors: Dooyoung Kim, Suwon-si (KR); Keonyoung Lee, Suwon-si (KR); Suyoung Park, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 17/976,246

(22) Filed: Oct. 28, 2022

(65) Prior Publication Data

US 2023/0076852 A1 Mar. 9, 2023

Related U.S. Application Data

(63) Continuation of application No. PCT/KR2021/004062, filed on Apr. 1, 2021.

(30) Foreign Application Priority Data

Apr. 28, 2020 (KR) ........................ 10-2020-0051641

(51) Int. Cl.
*H04W 8/18* (2009.01)
(52) U.S. Cl.
CPC ..................................... *H04W 8/18* (2013.01)
(58) Field of Classification Search
CPC ....................................................... H04W 8/18
(Continued)

(56) References Cited

U.S. PATENT DOCUMENTS 9,288,646 B2 * 3/2016 Ponukumati ............ H04W 4/16
10,237,757 B2 * 3/2019 Raleigh ................. H04W 24/02
(Continued)

FOREIGN PATENT DOCUMENTS

CN 102857941 B 4/2017
KR 10-2011-0036464 A 4/2011
(Continued)

OTHER PUBLICATIONS

International Search Report with Written Opinion dated Jul. 8, 2021, issued in International Patent Application No.
(Continued)

*Primary Examiner* — Jirapon Tulop
(74) *Attorney, Agent, or Firm* — Jefferson IP Law, LLP

(57) ABSTRACT

An electronic device is provided. The electronic device includes a processor, a plurality of SIMs connected to the at least one processor, wherein the at least one processor is configured to transmit or receive Internet packet data by using a first SIM, based on a first network and a first RAT, corresponding to the first SIM, when a second SIM supports a second RAT different from the first RAT, identify whether communication based on a second network and a second RAT, corresponding to the second SIM, can be performed during transmission or reception of the Internet packet data to or from the first network, and based on identifying that communication based on the second network and the second RAT, corresponding to the second SIM, can be performed, transmit or receive the Internet packet data based on the second network and the second RAT, corresponding to the second SIM.

18 Claims, 25 Drawing Sheets

(58) Field of Classification Search
USPC ........................................................ 455/418
See application file for complete search history.

(56) References Cited

U.S. PATENT DOCUMENTS

| | | | |
|---|---|---|---|
| 10,623,943 | B1 | 4/2020 | Sevindik et al. |
| 2011/0199987 | A1* | 8/2011 | Rommer ................. H04L 61/30 |
| | | | 370/329 |
| 2011/0269503 | A1 | 11/2011 | Park et al. |
| 2014/0274006 | A1 | 9/2014 | Mutya et al. |
| 2015/0181411 | A1 | 6/2015 | Kim |
| 2015/0223203 | A1 | 8/2015 | Lindner et al. |
| 2015/0312717 | A1* | 10/2015 | Shih ...................... H04W 4/025 |
| | | | 455/456.1 |
| 2016/0029222 | A1 | 1/2016 | Su et al. |
| 2016/0249204 | A1 | 8/2016 | Uhari et al. |
| 2017/0265114 | A1 | 9/2017 | Sahu et al. |
| 2018/0041953 | A1 | 2/2018 | Lindoff et al. |
| 2018/0084504 | A1 | 3/2018 | Lindoff et al. |
| 2018/0184309 | A1 | 6/2018 | Bhardwaj et al. |
| 2019/0069205 | A1 | 2/2019 | Lee et al. |
| 2019/0069224 | A1 | 2/2019 | Lee et al. |
| 2019/0110236 | A1 | 4/2019 | Huang et al. |
| 2019/0373443 | A1 | 12/2019 | Palaniappan et al. |
| 2020/0015303 | A1 | 1/2020 | Tsai et al. |
| 2020/0120585 | A1 | 4/2020 | Kumar et al. |
| 2021/0022209 | A1* | 1/2021 | Singh ...................... H04L 43/16 |
| 2025/0126546 | A1* | 4/2025 | Adjakple .............. H04W 48/18 |

FOREIGN PATENT DOCUMENTS

| | | |
|---|---|---|
| KR | 10-2015-0074415 A | 7/2015 |
| KR | 10-2019-0021647 A | 3/2019 |
| KR | 10-2020-0029462 A | 3/2020 |
| WO | 2016/028447 A1 | 2/2016 |
| WO | 2020/038076 A1 | 2/2020 |
| WO | 2020/045952 A1 | 3/2020 |

OTHER PUBLICATIONS

Extended European Search Report dated Nov. 6, 2023, issued in European Patent Application No. 21796420.4.

Korean Office Action dated Aug. 31, 2025, issued in a Korean Patent Application No. 10-2020-0051641.

* cited by examiner

1000

1010

ELECTRONIC DEVICE SUPPORTING PLURALITY OF SIMS AND OPERATING METHOD THEREFOR

CROSS-REFERENCE TO RELATED APPLICATION(S)

This application is a continuation application, claiming priority under §365(c), of an International application No. PCT/KR2021/004062, filed on Apr. 1, 2021, which is based on and claims the benefit of a Korean patent application number 10-2020-0051641, filed on Apr. 28, 2020, in the Korean Intellectual Property Office, the disclosure of which is incorporated by reference herein in its entirety.

BACKGROUND

1. Field

The disclosure relates to an electronic device supporting a plurality of subscriber identity modules and an operating method therefor.

2. Description of Related Art

In a wireless communication system, an electronic device (e.g., a user equipment (UE)) may access to a wireless communication network to use a voice communication service or a data communication service in a predetermined location or while on the move. An appropriate authorization process is required for providing the communication service to the electronic device. Generally, a universal integrated circuit card (UICC) is inserted into the electronic device, and authorization between the electronic device and a mobile network operator (MNO) is performed through a universal subscriber identity module (USIM) installed in the UICC. The UICC may be referred to as a subscriber identity module (SIM) card in case of a global system for mobile communications (GSM) scheme and a universal subscriber identity module (USIM) card in case of wideband code division multiple access (WCDMA), long-term evolution (LTE), and new radio (NR) schemes.

If a user of the electronic device subscribes to a wireless communication service that a mobile network operator provides, the mobile network operator may provide a UICC (e.g., a SIM card or a USIM card) to the user and the user may insert the provided UICC into his or her electronic device. If the UICC is inserted into the electronic device, a USIM application installed in the UICC may be executed to use an international mobile subscriber identity (IMSI) value stored in the UICC and an encryption key for authentication so as to perform an appropriate authentication process with the mobile network operator that stores the same values. After the appropriate authentication process is performed, the user may use the wireless communication service.

The electronic device may support two or more SIMs, and in case of supporting two SIMs, an electronic device may be referred to as a dual SIM electronic device and an electronic device supporting a plurality of SIMs may referred to as multi-SIM electronic device. The dual SIM or multi-SIM electronic device may support a plurality of SIM and respective SIMs may be related to different subscriptions. A device which transmits or receives a signal related to a plurality of SIM by one transceiver may be referred to as dual SIM dual standby (DSDS) device. If one of the plurality of SIMs transmits or receives a signal, another SIM may be in a standby mode. Alternatively, a device capable of simultaneously activating both SIMs may be referred to as a dual SIM dual active (DSDA) device.

The above information is presented as background information only to assist with an understanding of the disclosure. No determination has been made, and no assertion is made, as to whether any of the above might be applicable as prior art with regard to the disclosure.

SUMMARY

An electronic device supporting a plurality of SIMs may transmit or receive Internet packet data based on any one SIM. For example, the electronic device may select a SIM to transmit or receive Internet packet data based on manual selection of a user. However, there have not been disclosed a technology in which an electronic device selects (or recommends) a SIM supporting a better communication then current communication, for example, high data transmission speed or low latency communication.

Aspects of the disclosure are to address at least the above-mentioned problems and/or disadvantages and to provide at least the advantages described below. Accordingly, an aspect of the disclosure is to provide an electronic device and operating method that can change a SIM transmitting or receiving Internet packet data in case that communication better than current communication is executable.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor, wherein the at least one processor is configured to, by using a first SIM among a plurality of SIMs connected to the at least one processor, transmit or receive Internet packet data to or from a first network corresponding to the first SIM, based on a first RAT, when a second SIM among the plurality of SIMs supports a second RAT different from the first RAT, identify whether communication based on a second RAT with a second network corresponding to the second SIM is executable during transmission or reception of the Internet packet data to or from the first network, and based on identifying that communication based on the second RAT with the second network corresponding to the second SIM is executable, transmit or receive the Internet packet data to or from the second network corresponding to the second SIM, based on the second RAT.

In accordance with another aspect of the disclosure, an electronic device is provided. The electronic device includes at least one processor, wherein the at least one processor is configured to identify that a first SIM among a plurality of SIMs connected to the at least one processor supports a first RAT and a second RAT, identify that a second SIM among the plurality of SIMs connected to the at least one processor supports the first RAT and the second RAT, select a SIM from among the first SIM and the second SIM for performing communication based on the second RAT, and transmit or receive data related to the second RAT to or from a network corresponding to the selected SIM, based on the second RAT.

In accordance with another aspect of the disclosure, an operating method of an electronic device is provided. The method includes an operation of, by using a first SIM among a plurality of SIMs connected to at least one processor of the electronic device, transmitting or receiving Internet packet data to or from a first network corresponding to the first SIM, based on a first RAT, when a second SIM among the plurality of SIMs supports a second RAT different from the first RAT, an operation of identifying whether communication based on a second RAT with a second network corresponding to the second SIM is executable during transmission or reception of the Internet packet data to or from the first network, and based on identifying that communication based on the second RAT with the second network corresponding to the second SIM is executable, an operation of transmitting or receiving the Internet packet data to or from the second network corresponding to the second SIM, based on the second RAT.

According to various embodiments, there may be provided an electronic device and an operating method therefor which can change a SIM configured to transmit and receive Internet packet data in case that there is communication executable better than current communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
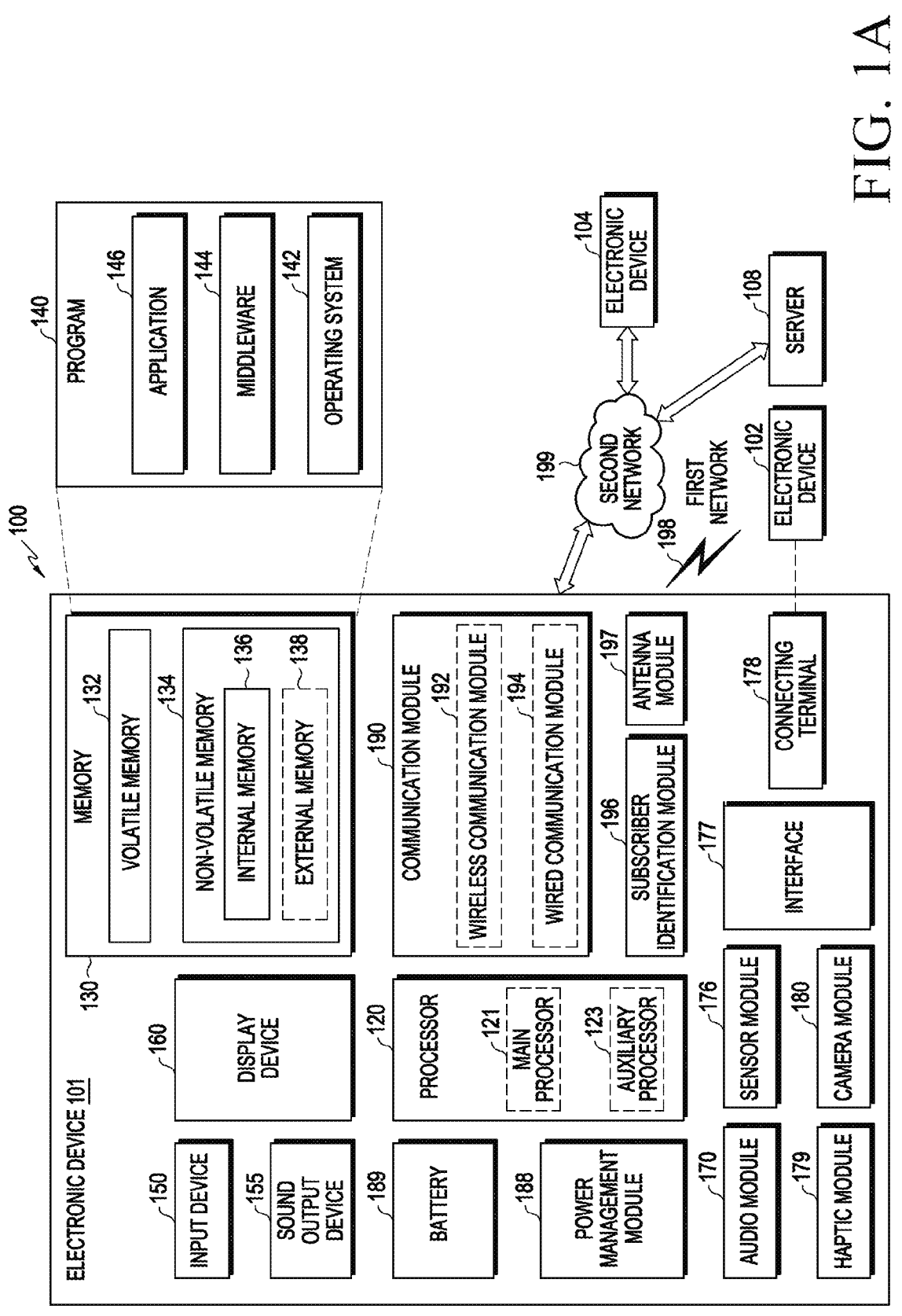
FIG. 1A is a block diagram illustrating an electronic device in a network environment according to an embodiment of the disclosure.

FIG. 1A is a block diagram illustrating an electronic device in a network environment according to an embodiment of the disclosure.

Referring to FIG. 1A, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to yet another embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to yet another embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to yet another embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to yet another embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to yet another embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to yet another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to yet another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to yet another embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to yet another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to yet another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to yet another embodiment, the antenna module 197 may include an antenna including a radiating element composed of a conductive material or a conductive pattern formed in or on a substrate (e.g., PCB). According to yet another embodiment, the antenna module 197 may include one or more antennas. In such a case, at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to yet another embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
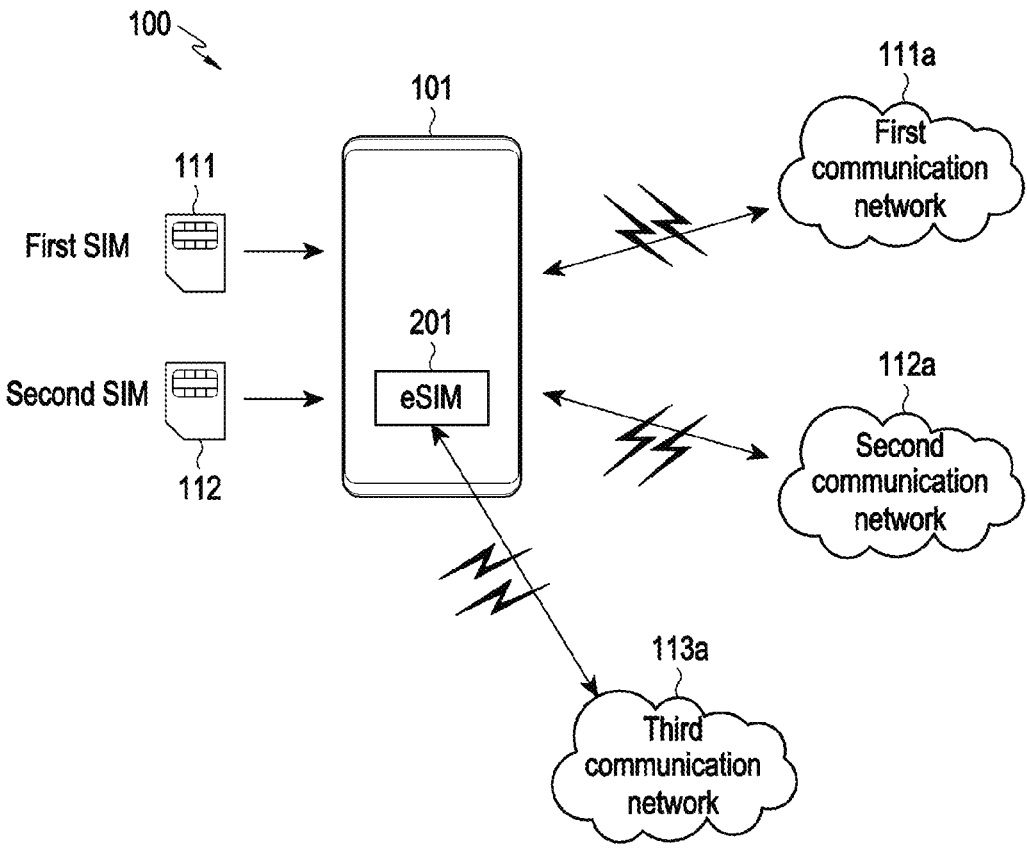
FIG. 1B is a view illustrating a network environment including an electronic device according to an embodiment of the disclosure.

FIG. 1B is a view illustrating a network environment including an electronic device according to an embodiment of the disclosure.

Referring to FIG. 1B, the network environment 100 according to various embodiments of the disclosure may include the electronic device 101, a first communication network 111a, a second communication network 112a, or a third communication network 113a.

According to various embodiments, the electronic device 101 may function as a dual SIM dual standby (DSDS) or dual SIM dual active (DSDA) electronic device which supports a plurality of SIMs in one device. For example, two SIMs, that is, the first SIM 111 and the second SIM 112, may be mounted to the electronic device 101. The first SIM 111 and the second SIM 112 may be detachable removable SIMs (rSIMs). The rSIM may be a SIM attachable or detachable to a slot provided on the electronic device 101 and may not have limitation in shape/standard. For example, two SIM cards may be mounted to the electronic device 101 to support the two SIM. Hereinafter, for the convenience of explanation, the SIM card will be referred to as a SIM. As shown in FIG. 1B, two SIM cards, that is, the first SIM 111 and the second SIM 112 may be mounted to the electronic device 101. The electronic device 101 may include a first structure, that is, a first slot (not shown) and a second slot (not shown) therein for receiving the first SIM 111 and the second SIM 112, respectively.

For example, the first SIM 111 is a SIM subscribed to a mobile network operator of the first communication network 111*a* and the electronic device 101 may receive a wireless communication service by accessing the first communication network 111*a*, by using the first SIM 111. The second SIM 112 is a SIM subscribed to a mobile network operator of the second communication network 112*a* and the electronic device 101 may receive a wireless communication service by accessing the second communication network 112*a* by using the second SIM 112. According to various embodiments, the electronic device 101 may include an embedded subscriber identification module (eSIM) 201. The eSIM may be referred to as an eUICC. The electronic device 101 may receive a wireless communication service by accessing the third communication network 113*a*, by using the eSIM 201. At least a portion of the first communication network 111*a*, the second communication network 112*a*, or the third communication network 113*a* may be provided by the same mobile network operator or each of different mobile network operators.

Figure 2:
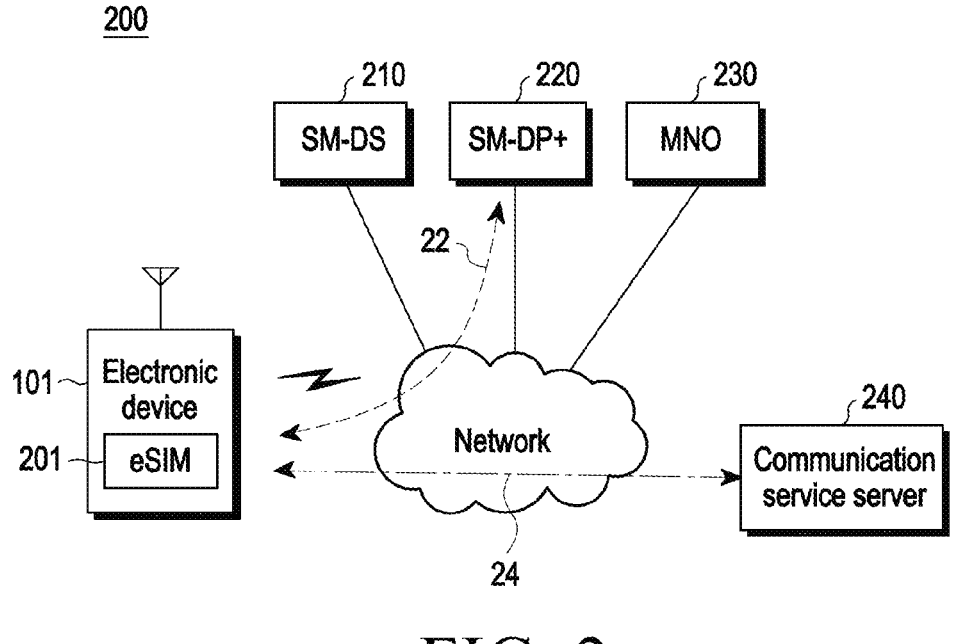
FIG. 2 is a view illustrating a system configured to provide profile-based communication connection to an electronic device according to an embodiment of the disclosure.

FIG. 2 is a view illustrating a system configured to provide profile-based communication connection to an electronic device according to an embodiment of the disclosure.

Referring to FIG. 2, a system 200 according to various embodiments may include an electronic device 101, a SM-DS server 210, a SM-DP+ server 220, an MNO server 230, and a communication service server 240.

The electronic device 101 (e.g., the electronic device 101 in FIG. 1A) according to various embodiments may include an eSIM 201. Although not shown for the convenience of explanation, the electronic device 101 may include two or more slots capable of receiving two or more rSIMs. Alternatively, the electronic device 101 may be implemented to include one slot capable of receiving two eSIMs and one rSIM. According to various embodiments, the electronic device 101 may include or receive N (N is a natural number) SIMs (eSIMs or rSIMs) and may perform switching to receive a portion thereof. There is no limitation in a combination of N SIMs and no limitation in the number thereof.

According to various embodiments, the eSIM 201 may be implemented to be inserted into the electronic device 101, integrated with the electronic device 101, or accessible by the electronic device 101. According to various embodiments, the eSIM 201 may cause the electronic device 101 to perform authentication with a server of a mobile network operator (MNO) by using information (e.g., a profile including universal subscriber identity module (USIM) information) in the eSIM 201. According to an embodiment, the eSIM 201 may be referred to as a subscriber identity module (SIM) card or a wideband code division multiple access in case of a global system for mobile communications (GSM) scheme, may be referred to as a universal subscriber identity module (USIM) card in case of wideband code division multiple access (WCDMA), long-term evolution (LTE), and new radio (NR) schemes, and may be referred to as various names according to a communication scheme. For example, in case that a user of the electronic device 101 subscribes to a wireless communication service provided by a mobile network operator, the electronic device 101 may use information in the eSIM 201, such as an international mobile subscriber identity (IMSI) value or a K value which is an encryption key for authentication to perform an appropriate authentication process with a server of the mobile network operator, in which the same values are stored, and then use the wireless communication service. For example, the appropriate authentication process may be authentication and key agreement (AKA) authentication and may be performed in various other authentication schemes.

According to various embodiments, the eSIM 201 may be manufactured as a dedicated card for a mobile network operator at the request of the mobile network operator, and authentication information (e.g., a USIM application and a subscriber identification ID (e.g., IMSI)) for network access of a corresponding mobile network operator and an encryption key (e.g., a known K value or Ki value) may be stored in advance. The application (or information) in the eSIM 201 may be installed, modified, deleted, or updated, if necessary, by using a technology such as an over the air (OTA) technology.

According to various embodiments, eSIM 201 may download or/and store information for a communication service in a form of profile. According to another embodiment, the profile may be installed or stored in the manufacturing state of the eSIM 201, or may be downloaded by a terminal in the over the air (OTA) scheme to be installed or stored in the eSIM 201. For example, the profile may include a provisioning profile and an operational profile. In case that the provisioning profile is not installed, the electronic device 101 may download the operational profile through near field connection of Wi-Fi or Internet connection, and thus it will be appreciated by those skilled in the art that the provisioning profile need not necessarily be installed in the electronic device 101. For example, the operational profile may be a profile including a subscriber identification information of a user of an electronic device and the provisioning profile may include information (hereinafter, also referred to as "first information") for downloading subscriber identification information and a profile (hereinafter, also referred to as a "first operational profile") including subscriber identification information (hereinafter, also referred to as 37 first subscriber identification information) by an electronic device. The electronic device may download the first operational profile, based on the first information included in the provisioning profile in the eSIM 201.

According to various embodiments, the electronic device 101 may receive a communication service by using subscriber identification information (hereinafter, also referred to as "second subscriber identification information") of an operational profiled (hereinafter, also referred to as a "second operational profile") installed or stored in the eSIM 201. For example, the profile including subscriber identification information may be a subscriber identity module (SIM) profile.

According to an embodiment, the operational profile may include, in addition to the subscriber identification information, network access authentication information of a subscriber, a telephone directory of a subscriber, personal information (e.g., SMS) of a subscriber, a name of a mobile network operator to which a subscriber subscribes, an available service, an available data amount, a charge or a service provision speed, information for authenticating a subscriber and generating a traffic security key to enable the secure use of wireless communication when accessing a wireless communication network, such as a GSM, WCDMA, LTE, and NR.

According to various embodiment, the first information for downloading data (e.g., the first operational profile) including the first subscriber identification information may include communication session information for first communication connection designated for downloading the first operational profile. For example, the communication session information may include access information about a subscription manager discovery service (SM-DS) server 210 for downloading the first operational profile or mobile network operator network information available for access to the SM-DS server 210.

According to various embodiments, the SM-DS server 210 may provide the electronic device 101 with an address of a SM-DP+ server 220 for downloading the first operational profile based on the provisioning profile.

According to various embodiments, the subscription manager data preparation plus (SM-DP+) server 220 may refer to a profile provision server, an off-card entity of a profile domain, a profile encryption server, a profile generation server, a profile provisioner, or a profile provider. The SM-DP+ server 220 may perform a first communication connection 22 with the electronic device 101 over a wireless communication network based on a first communication connection request based on the provisioning profile from the electronic device 101 and may provide the first operational profile to the electronic device 101 through the first communication connection 22. According to various embodiments, the wireless communication network may include a particular node of the wireless communication network. For example, the wireless communication network may include at least one of a base station, a subscriber information management node, or a mobility management node of the wireless communication network. According to an embodiment, the wireless communication network may include a home location register (HLR) and/or authentication center (AuC) server that the electronic device 101 accesses to perform a user authentication function and may be connected to a communication service server 240 to which the electronic device accesses after authentication in order to receive a communication service, such as voice communication or data communication.

According to various embodiments, the mobile network operator (MNO) server 230 may be a server related to a mobile network operator. According to various embodiments, the MNO server 230 may request the SM-DP+ server 220 to prepare at least one profile (or profile package) (e.g., the first operational profile) related to at least one subscriber identification information (e.g., the subscriber identification information) and may transfer information related to the first operational profile to the SM-DP+ server 220. According to an embodiment, the MNO server 230 may transfer a signal for updating and managing the first operational profile to the SM-DP+ server 220. The MNO server 230 may allow a second communication connection 24 between the electronic device 101 and the communication service server 240 through the second operational profile installed in the eSIM 201 of the electronic device 101.

According to various embodiments, the communication service server 240 may be a server that provides a communication service. According to various embodiments, the communication service may be a service related to the transmission or reception of data over the wireless communication network. According to an embodiment, the communication service may include a service related to the transmission or reception of other profiles (or data) including no subscriber identification information other than downloading of the operational profile (e.g., the first operational profile including the first subscriber identification information). For example, the communication service server 240 may include a service server related to the transmission or reception of various types of data, such as, for example, and without limitation, a server related to each of various applications, a push server, a search server, a market server, and the communication service by the communication service server 240 may include various services, such as, data transmission or reception, notification reception, push reception, link reception and connection, a service request by an application.

According to various embodiments, the electronic device 101 may perform the second communication connection 24 with the communication service server 240 based on the second operational profile upon request for a service related to the transmission or reception of a profile (or data) including no subscriber identification information.

According to various embodiments, The SM-DS server 210, the SM-DP+ server 220, the MNO server 230, or the communication service server 240 is provided merely as an illustrative example of servers performing respective functions thereof and each of the SM-DS server 210, the SM-DP+ server 220, the MNO server 230, or the communication service server 240 may each include one or a plurality of servers. Some or all of the SM-DS server 210, the SM-DP+ server 220, the MNO server 230, or the communication service server 240 may be configured as a single integrated server. According to various embodiments, an electronic device (e.g., the electronic device 101 in FIG. 1A or 1B, or the electronic device 101 in FIG. 2) may include a display (e.g., the display device 160 in FIG. 1A), a communication module (e.g., the communication module 190 in FIG. 1A), an embedded subscriber identification module (e.g., the subscriber identification module 196 in FIG. 1A or the eSIM 201 in FIG. 2) configured to download data including first subscriber identification information for accessing to at least one communication service, a memory (e.g., the memory 130 in FIG. 1A or the memory 211 in FIG. 2), and a processor (e.g., the processor 120 in FIG. 1A) electrically connected to the display, the communication module, and the memory, wherein the processor is configured to perform the first communication connection for downloading data including the first subscriber identity information based on the first information by using the communication module, terminate the first communication connection when receiving a request to transmit or receive data not including the first subscriber identity information during the first communication connection, and perform a second communication connection based on second subscriber identification information to perform the transmission or reception of the data.

According to various embodiments, the first information may include a provisioning profile, and the first data including the first subscriber identity information may include a first operational profile.

According to various embodiments, the processor may be configured to display, through the display, information indicating that a second operational profile corresponding to the second subscriber identity information does not exist on the display in case that the second subscriber identity information does not exist in the subscriber identity module when receiving the request to transmit or receive the data during the first communication connection.

According to various embodiments, the processor may be further configured to display a purchase screen related to the second operational profile in case that the second operational profile does not exist.

According to various embodiments, the processor may be configured to perform a second communication session based on a previously used second operational profile.

According to various embodiments, the processor may be configured to perform a second communication session based on the second operational profile that is selected by a user.

According to various embodiments, the processor may be configured to display at least one indicator indicating the first communication connection based on the provisioning profile through the display.

According to various embodiments, the at least one indicator may include at least one type among a service provider name (SPN), a radio access technology (RAT), and a received signal strength indicator (RSSI).

According to various embodiments, the processor may be configured to select the provisioning profile related to a network being connected through the communication module.

According to various embodiments, the processor may be configured to select the provisioning profile related to a connected network based on at least one of a PLMN identifier, an MCC, and regional information of the network being connected through the communication module.

Figure 3:
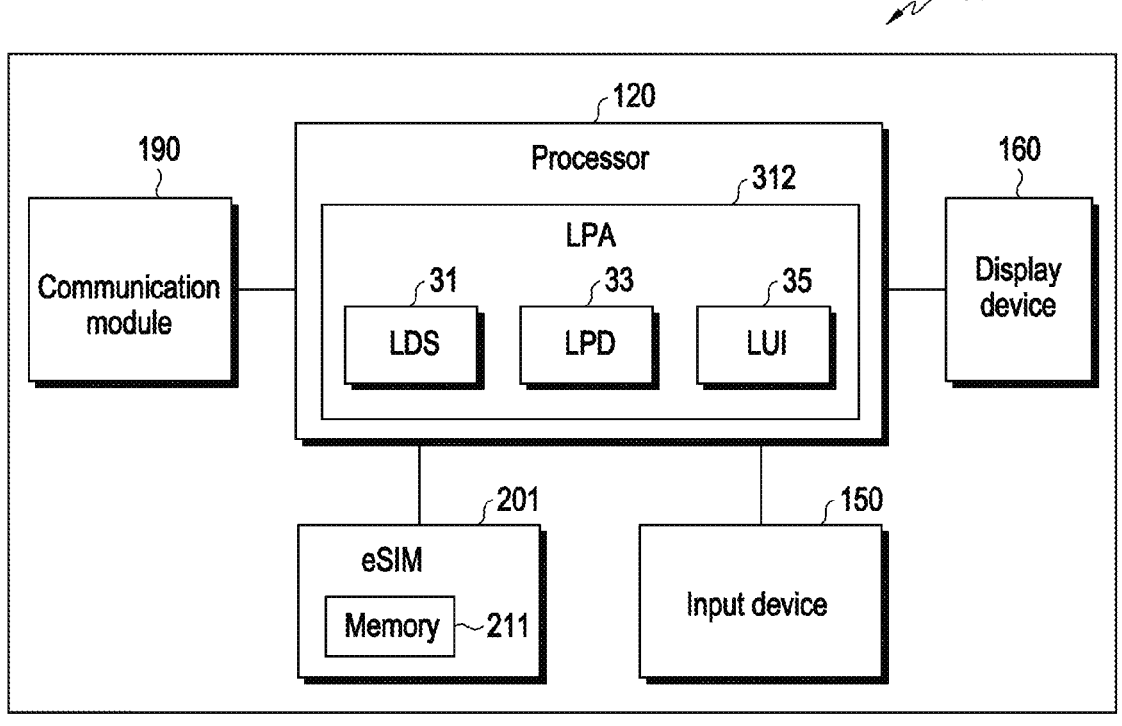
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, the electronic device 101 in FIG. 1A or 1B or the electronic device 101 in FIG. 2 according to various embodiments may include a processor 120, an eSIM 201, a communication module 190, a display device 160, and an input device 150. Although not shown for the convenience of explanation, the electronic device 101 may include two or more slots capable of receiving two or more rSIMs.

According to various embodiments, the processor 120 (e.g., the processor 120 in FIG. 1A) may include one or a plurality of processors (e.g., the main processor 121 and the coprocessor (i.e., auxiliary processor 123 in FIG. 1A) or an application processor and a communication processor) and may include a local profile assistant (LPA) 312 (e.g., an LPA device (LPAd)) according to an embodiment. According to various embodiments, when the processor 120 includes a plurality of processors, a portion of the LPA 312 may be included in some of the plurality of processors, and another portion of the LPA 312 may be included in others of the plurality of processors. According to various embodiments, the LPA 312 may be included in the eSIM 201, and the LPA 312 may be referred to as an LPA eUICC (LPAe) in this case.

According to various embodiments, the LPA 312 may perform communication with a server to support operations of downloading, installing, and managing a profile of the eSIM 201 or may perform a function of providing a user interface necessary for the operations of downloading, installing, and managing the profile. The LPA 312 may be a module that provides local discovery services (LDSs) 31, local profile download (LPD) 33, and local user interface (LUI) 35 operations in the electronic device 101.

According to various embodiments, the LDS 31 may perform an operation of receiving an address of an SM-DP+ server (e.g., the SM-DP+ server 220 in FIG. 2) for downloading an operational profile based on communication with an SM-DS server (e.g., the SM-DS server 210 in FIG. 2) and a provisioning profile from the SM-DS server 210.

According to various embodiments, the LPD 33 may perform a first communication connection (e.g., the first communication connection 22 in FIG. 2) with the SM-DP+ server 220 via a wireless communication network based on the address of the SM-DP+ server 220 and may perform an operation of receiving a first operational profile from the SM-DP+ server 220 via the first communication connection 22. According to various embodiments, the LPD 33 may support an operation of downloading, enabling, disabling, or deleting a profile or an operation of downloading a policy rule, which is initiated by the network, or may support an operation of enabling, disabling, or deleting a profile or an operation of resetting an eUICC by the electronic device.

According to various embodiments, the LUI 35 may perform an operation of providing various user interfaces when the operational profile is downloaded. According to another embodiment, the LUI 35 may support data exchange between the LDS 31 and the LPD 33, and the user, and may include a user interface (UI) for transferring a user's input to the LDS 31 or the LPD 33.

According to yet another embodiment, the processor 120 may perform a communication service by using (or executing) the LPA 312 based on information stored in the eSIM 201. For example, the processor 120 may perform a first communication connection 22 with the SM-DP+ 220 through the communication module 190 by using the LPA 312 based on the provisioning profile stored in the eSIM 201 in order to download a profile (e.g., the first operational profile) including a first subscriber identification information. The processor 120 may terminate the first communication connection 22 and may perform a second communication connection (e.g., the second communication connection 24 in FIG. 2) based on second subscriber identification information to transmit or receive the profile or data including the subscriber identification information, when receiving a request to transmit or receive a profile or data including no subscriber identification information during the first communication connection 22 using the LPA 312.

According to various embodiments, the eSIM 201 (e.g., the subscriber identification module 196 in FIG. 1A or the eSIM 201 in FIG. 2) may include one or a plurality of profiles as information for receiving a communication service. A profile may refer, for example, to a packaged software form of at least one of an application, a file system, and an authentication key value stored in the eSIM 201. For example, the profile may include a provisioning profile and an operational profile. The operational profile may include subscriber identification information and may include, in addition to the subscriber identification information, network access authentication information of a subscriber, a telephone directory of a subscriber, personal information (e.g., SMS) of a subscriber, a name of a mobile network operator to which a subscriber subscribes, an available service, an available data amount, a charge or a service provision speed, or information for authenticating a subscriber and generating a traffic security key to enable the secure use of wireless communication when accessing a wireless communication network, such as a GSM, WCDMA, LTE, and NR. According to yet another embodiment, the operational profile may include a SIM profile. For example, the SIM profile may include a SIM file system (a master file (MF), a dedicated file (DF), an elementary file (EF)), and a subscriber identification information value (IMSI) may be stored in the elementary file.

According to various embodiments, the provisioning profile may be a profile that includes first information for the electronic device to download a first operational profile. For example, the first information may include communication session information for a first communication connection designated for downloading the first operational profile. For example, the communication session information may include access information about an SM-DS server (e.g., the SM-DS server 210 in FIG. 2) for downloading the first operational profile and MNO network information available for access to the SM-DS server.

According to various embodiments, the communication module 190 (e.g., the communication module 190 in FIG. 1A) may perform the first communication connection 22 based on the provisioning profile or the second communication connection 24 based on a second operational profile. The display device 160 may display at least one screen related to the first communication based on the provisioning profile or the second communication based on the second operational profile.

Although, the LPA 312 has been described as a component included in the processor 120 according to yet another embodiment, at least a portion of a function of the LPA 312 may be performed by the processor 120 or a separate LPA 312 may be operated in conjunction with the processor 120. For example, the LPA 312 may be included in a program (e.g., the program 140 in FIG. 1A), or may be loaded onto and executed by the processor 120, and when the LPA 312 is loaded onto and executed by the processor 120, an operation of the LPA may be understood as an operation of the processor 120. According to various embodiments, the function module (e.g., the LDS 31, the LPD 33, or the LUI 35) included in the LPA 312 is shown as being separated, without being limited to the embodiment. According to various embodiments, the LPA 312 may be included in the eSIM 201.

Figure 4:
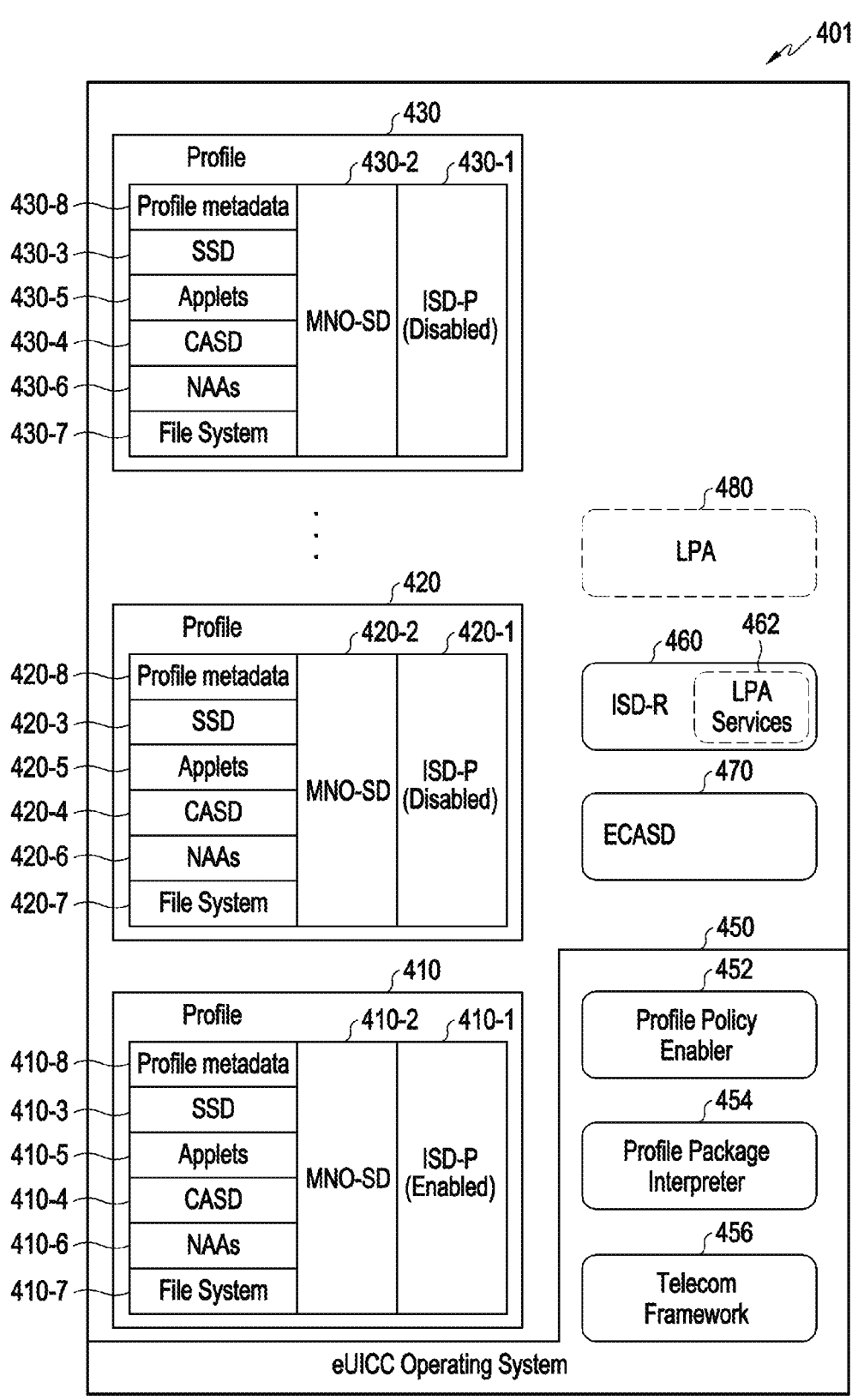
FIG. 4 is a view illustrating an internal structure of an eUICC according to an embodiment of the disclosure.

FIG. 4 is a view illustrating an internal structure of an eUICC according to an embodiment of the disclosure.

Referring to FIG. 4, an eUICC 401 (e.g., the eSIM 201 in FIG. 2 or 3) according to an embodiment may have a card or chip form, and at least one profile 410, 420, 430 in a software format may be installed therein. According to various embodiments, the at least one profile 410, 420, 430 may each correspond to a provisioning profile or an operational profile. The at least one profile 410, 420, 430 may operate on an eUICC operating system (OS) 450. Each of the at least one profile 410, 420, 430 may be in an enabled state or a disabled state by a processor or an LPA (e.g., the LPA 312 in FIG. 3 or the LPA 480 in FIG. 4). In FIG. 4, according to another embodiment, one profile 410 may be in an enabled state, and the remaining profiles 420, 430 may be in a disabled state.

According to various embodiments, the eUICC operating system (OS) 450 of the eUICC 401 may include a profile policy enabler 452, a profile package interpreter 454, and a telecom framework 456. According to yet another embodiment, the profile policy enabler 452 may manage a policy rule (PPR) for each of the at least one profile 410, 420, 430. According to yet another embodiment, the profile package interpreter 454 may unpackage a profile package, received from the SM-DP+ (e.g., the SM-DP+ 220 in FIG. 2), into a form that may be installed in the eUICC 401. According to yet another embodiment, the telecom framework 456 may perform a function related to communication for applications in the eUICC 401. According to various embodiments, the eUICC 401 may include an issuer security domain root (ISD-R) 460 and an eUICC controlling authority security domain (ECASD) 470. According to yet another embodiment, the ISD-R 460 may manage the at least one profile 410, 420, 430 installed in the eUICC 401. For example, the ISD-R 460 may include an LPA service 462, and the LPA service 462 may manage the at least one profile 410, 420, 430 installed in the eUICC 401 through an interface with a processor or an LPA (e.g., the LPA 312 in FIG. 3 or the LPA 480 in FIG. 4). According to yet another embodiment, the ECASD 470 may perform security processing of the at least one profile 410, 420, 430 installed in the eUICC 401.

According to various embodiments, each of the at least one profile 410, 420, or 430 may include an ISD-P 410-1, 420-1, or 430-1, an MNO-SD 410-2, 420-2, or 430-2, a supplementary security domain (SSD) 410-3, 420-3, or 430-3, a controlling authority security domain (CASD) 410-4, 420-4, or 430-4, applets 410-5, 420-5, or 430-5, network access applications (NAAs) 410-6, 420-6, or 430-6, a file system 410-7, 420-7, or 430-7, or profile metadata 410-8, 420-8, or 430-8.

According to an example embodiment, the ISD-P 410-1, 420-1, or 430-1 may include information for decoding and interpreting a profile package, and may be used to unpackage and install a profile package, received from the SM-DP+ 220, in cooperation with the profile package interpreter 454.

According to yet another embodiment, the MNO-SD 410-2, 420-2, 430-2 may include an over-the-air (OTA) key of an MNO, and may include information for providing a secure OTA channel for communication with the MNO.

According to yet another embodiment, the SSD 410-3, 420-3, or 430-3 and the controlling authority security domain (CASD) 410-4, 420-4, or 430-4 may include information for performing security processing of the profile.

According to yet another embodiment, the Applets 410-5, 420-5, or 430-5 may include various pieces of application information related to a user of the profile.

According to an example embodiment, the network access applications (NAAs) 410-6, 420-6, or 430-6 may include application information that enables the profile to access a network.

According to yet another embodiment, the file system 410-7, 420-7, or 430-7 may include a file system related to each piece of information of the profile.

According to yet another embodiment, the profile metadata 410-8, 420-8, or 430-8 may also be referred to as a profile record and may include metadata information about the profile in a text form. The metadata information may include an integrated circuit card ID (ICCID) of the profile, a profile name, the name of a profile-providing MNO, a profile nickname of a user, an icon, a profile class, notification configuration information, profile owner information, or a profile policy rule.

According to various embodiments, the ICCID of the profile may indicate the unique identifier of each profile as a profile identifier. The profile name may include the name of each profile. The name of the profile-providing MNO may include the name of the MNO providing the profile. The profile nickname of the user may include a user-specified profile nickname. The icon may include an icon corresponding to the profile. The profile class may include information indicating whether the type of the profile is a provisioning profile or an operational profile. The notification configuration information may include an address of a server (e.g., the SM-DP+ server 220) to receive a notification. The profile owner information may include a mobile country code (MCC), a mobile network code (MNC), and a group identifier (GID) 1 or 2 related to a profile owner. For example, the MCC may be a code for identifying a country, and the MNC may be a code for identifying an MNO. GID 1 or 2 may be regional code information for identifying the group or the region to which the profile belongs. The regional information may include a group including a plurality of countries. The profile policy rule (PPR) may include policy rule information for managing the profile.

The electronic device 101 according to various embodiments may identify whether a profile is a provisioning profile or an operational profile by using profile class information of the profile metadata 410-8, 420-8, or 430-8 included in each of the at least one profile 410, 420, 430 included in the eUICC 401, and may enable or disable the provisioning profile or the operational profile via the LPA (the LPA 312 in FIG. 3 or the LPA 480 in FIG. 4).

Figure 5A:
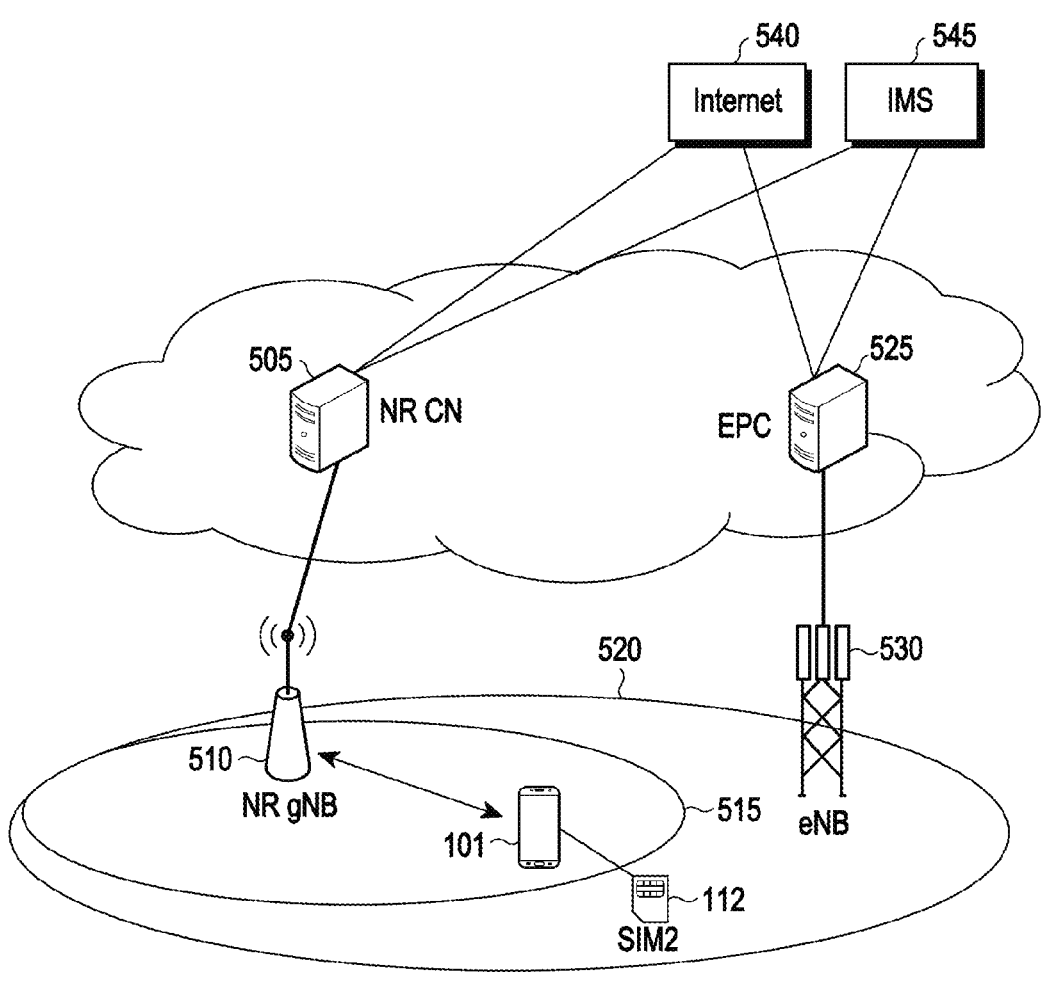
FIG. 5A illustrates an electronic device and a network according to an embodiment of the disclosure.

FIG. 5A illustrates an electronic device and a network according to an embodiment of the disclosure.

Figure 5B:
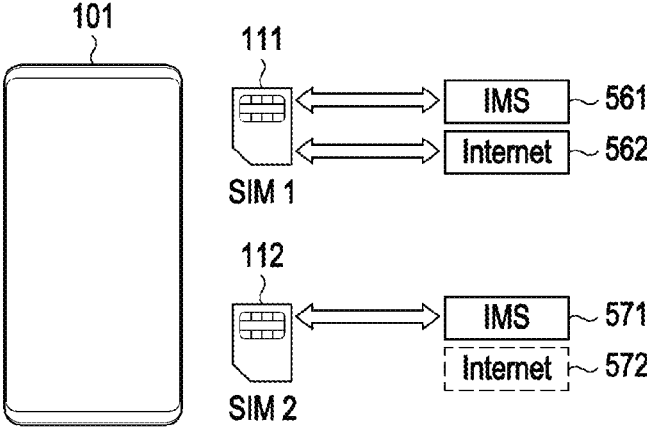
FIG. 5B illustrates PDN connection according to an embodiment of the disclosure.

FIG. 5B illustrates PDN connection according to an embodiment of the disclosure.

Referring to FIGS. 5A and 5B, according to various embodiments, the electronic device 101 may transmit or receive a communication signal based on the NR-gNB 510 and a radio access technology (RAT) of the NR. The NR-gNB 510 may transmit data received through a NR core network (CN) 505 to the electronic device 101, or transfer data from the electronic device 101 to an Internet protocol (IP) network (e.g., the Internet network 540 and/or an IP multimedia subsystem (IMS) network 545 via the NR core network 505. The IP network may be referred to as, for example, a data network or a packet data network. For example, the electronic device 101 may transmit or receive a communication signal to or from the NR-gNB 510 within a coverage 515 of the NR-gNB 510. The electronic device 101 may transmit or receive a communication signal to or from the NR-gNB 510 in a stand-alone (SA). The electronic device 101 may transmit or receive a control message and/or user data to or from the NR-gNB 510. Alternatively, the electronic device 101 may transmit or receive a communication signal to or from the NR-gNB 510 in a non-stand-alone (NSA). The electronic device 101 may transmit or receive user data to or from the NR-gNB 510. The electronic device 101 may establish a priority connection with a base station (e.g., the eNB 530) of LTE in an NSA to transmit or receive a control message, and then may perform a procedure (e.g., at least one procedure configured for SCG addition) of adding the NR-gNB 510. Those skilled in the art will appreciate that the various embodiments of the disclosure are applicable to at least one of a SA or a NSA.

In FIG. 5A, it will be assumed that the electronic device 101 transmits or receives a communication signal based on the second SIM 112 in FIG. 1B based on LTE and/or NR. The NR-gNB 510, the eNB 530, the NR CN 505, and the EPC 525 may correspond to a second operator of the second SIM 112. Although not shown, those skilled in the art will appreciate that the electronic device 101 may transmit or receive data through the NR-gNB (not shown), the eNB (not shown), the NR CN (not shown), and the EPC (not shown) by the first operator of the first SIM 111 based on the first SIM 111 in FIG. 1B.

According to various embodiments, the electronic device 101 may transmit and receive a communication signal to or from the eNB 530 based on the RAT of LTE. The NR-gNB 530 may transmit data received through an evolved packet core (EPC) 525 to the electronic device 101, or transfer data from the electronic device 101 to an IP network (e.g., the Internet network 540 and/or the IMS network 545) via the EPC 525. The eNB 530 may perform communication with an electronic device within an LTE coverage 520, and the LTE coverage 520 may be broader than the NR coverage 515, for example. Although, in FIG. 5A, both the NR core network 505 and the EPC 525 are capable of transmitting or receiving data in the Internet network 540 and the IMS network 545, this is merely illustrative and at least a portion of the NR core network 505 and the EPC 525 may support only one of the Internet network 540 and the IMS network 545.

According to various embodiments, the electronic device 101 may transmit packet data to the IP network through the NR-gNB 510 and/or the eNB 530. The packet data may include at least one of Internet packet data or IMS packet data. The electronic device 101 may transmit or receive Internet packet data for a data service and may transmit or receive IMS packet data for an IMS service (e.g., an IMS call, VoLTE, or VoLR). At least one of the NR core network 505 and the EPC 525 may route at least one of Internet packet data or IMS packet data.

For example, as shown in FIG. 5B, the electronic device 101 may be configured to transmit or receive a data packet through both an IMS network 561 and an Internet network 562 with respect to the first SIM 111. For example, the electronic device 101 may transmit or receive a data packet based on a protocol stack (hereinafter, will be also referred to as a first protocol stack) corresponding to the first SIM 111. The electronic device 101 may transmit or receive a data packet based on information (e.g., an access point name (APN)) stored in the first SIM 111. The electronic device 101 may be configured to transmit or receive a data packet with respect to an IMS network 571 based on the second SIM 112 but not to transmit or receive a data packet with respect to an Internet network 572. For example, the electronic device 101 may configure the first SIM 111 as a SIM for transmitting or receiving an Internet data packet, based on a user input. For example, the electronic device 101 may configure the first SIM 111 as a SIM for transmitting or receiving an Internet data packet, based on a default configuration. For example, the electronic device 101 may configure the first SIM 111 as a SIM for transmitting or receiving an Internet data packet, based on a comparison result of a priority of each of the first SIM 111 and the second SIM 112. The electronic device 101 may transmit or receive a data packet based on a protocol stack (hereinafter, will be also referred to as a second protocol stack) corresponding to the second SIM 112. The electronic device 101 may transmit or receive a data packet based on information (e.g., an APN) stored in the second SIM 112. The electronic device 101 may allocate an Internet packet data network (PDN) to the first protocol stack and thus may transmit or receive Internet packet data through a network corresponding to the first SIM 111. The PDN may be also referred to as an APN or packet data unit (PDU) session. The electronic device 101 may allocate the IMS PDN to the first protocol stack and the second protocol stack and thus may transmit or receive IMS packet data according to one of a network corresponding to the first SIM 111 and a network corresponding to the second SIM 112.

For example, in FIG. 5A, it is assumed that the electronic device 101 allocates the IMS PDN to the second protocol stack and configures the Internet PDN and the IMS PDN to the first protocol stack. The electronic device 101 may transmit or receive IMS packet data to or from the IMS network 545 through NR and/or LTE. The electronic device 101 may transmit or receive Internet packet data to or from the Internet network 540 through a network of the second SIM 112. Although not shown, the electronic device 101 may transmit or receive Internet packet data to or from an Internet network through a network of an operator of the first SIM 111.

In some cases, the electronic device 101 may be in a state capable of transmitting or receiving Internet packet data through LTE based on the first SIM 111. For example, in case that the electronic device 101 is out of an NR coverage of an operator of the first SIM 111, Internet packet data may need to be transmitted or received through LTE. Meanwhile, the electronic device 101 may be capable of communication through NR based on the second SIM 112. For example, as shown in FIG. 5A, the electronic device 101 may be located within the NR coverage 515 of the operator of the second SIM 112, and NR communication based on the second SIM 112 may be executable. Even if the electronic device 101 is capable of NR communication based on the second SIM 112, as the Internet PDN is allocated to the first protocol stack, Internet packet data may be transmitted or received through LTE based on the first SIM 111, inevitably. In case that the Internet PDN is allocated to one protocol stack and communication according to an RAT improved according to another protocol stack, the electronic device 101 according to various embodiment may improve a transmission or reception speed of Internet packet data by allocating the Internet PDN to another protocol stack.

Figure 6A:
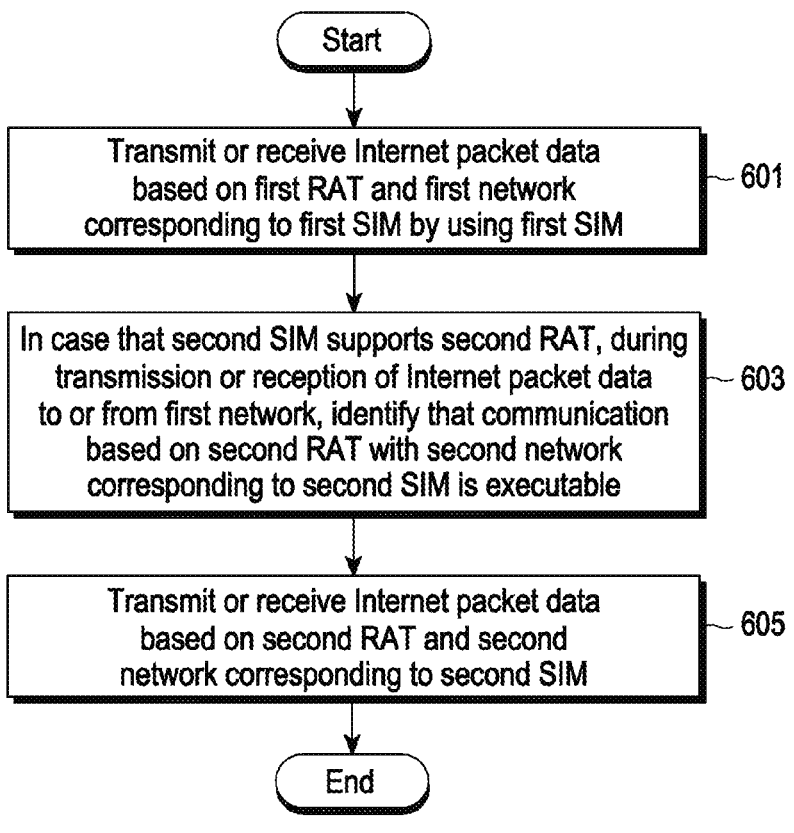
FIG. 6A is a flowchart illustrating an operating method of an electronic device according to an embodiment of the disclosure.
Figure 7A:
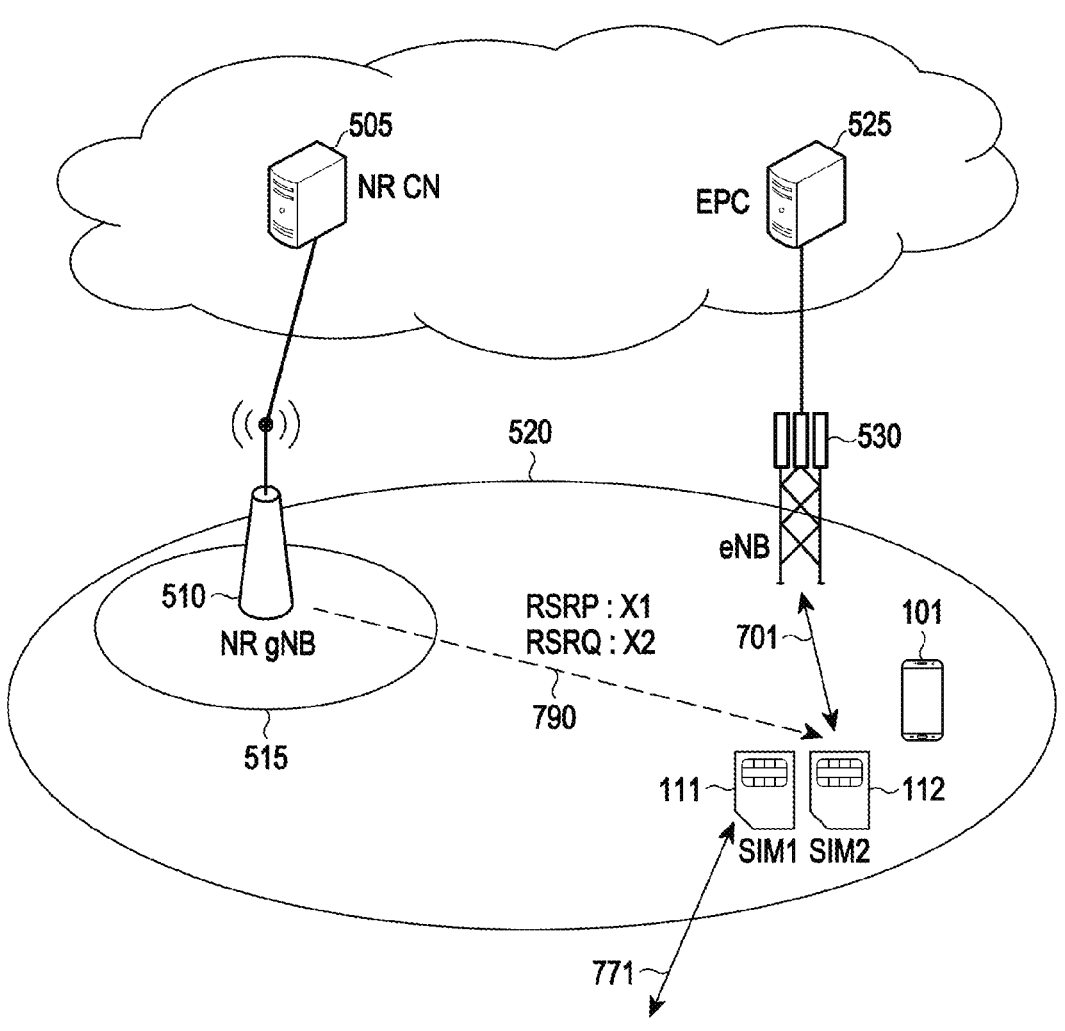
FIG. 7A illustrates an electronic device and a network according to an embodiment of the disclosure.
Figure 7B:
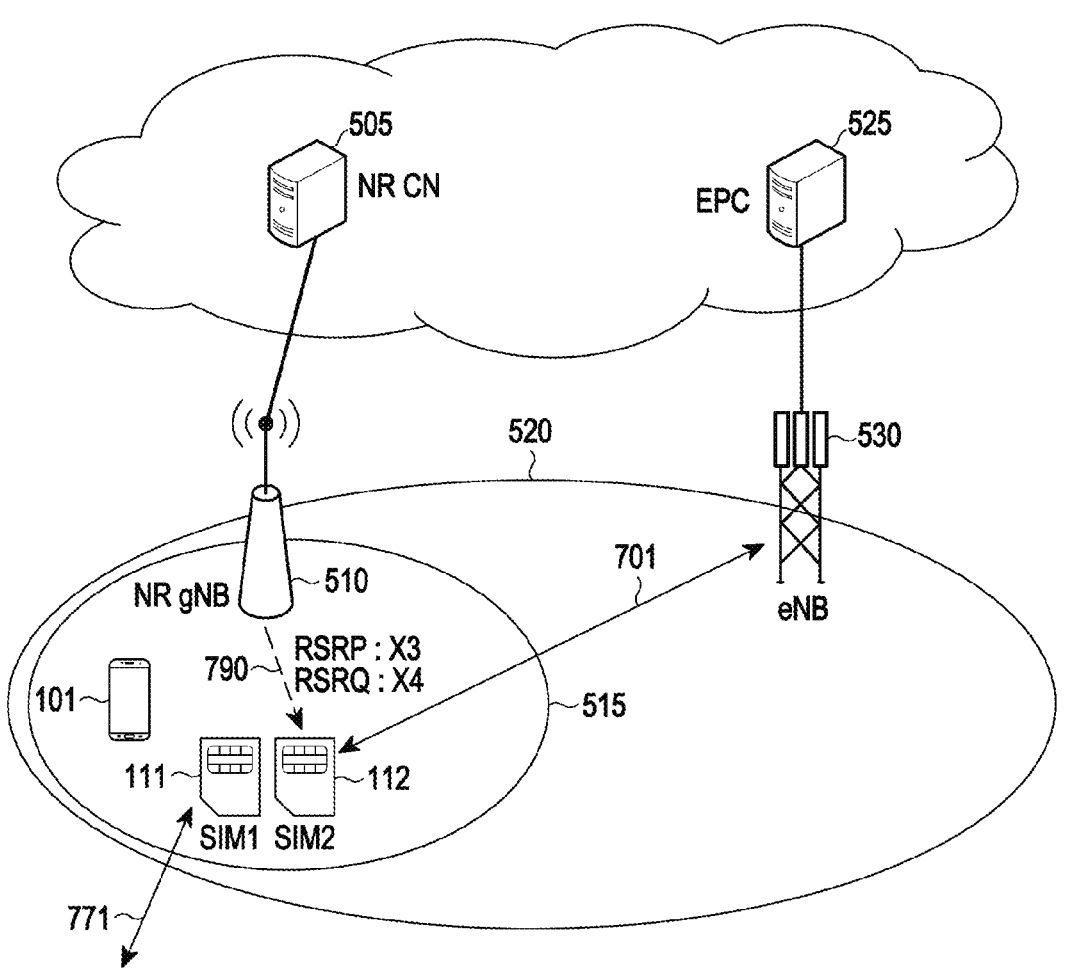
FIG. 7B illustrates an electronic device and a network according to an embodiment of the disclosure.
Figure 7C:
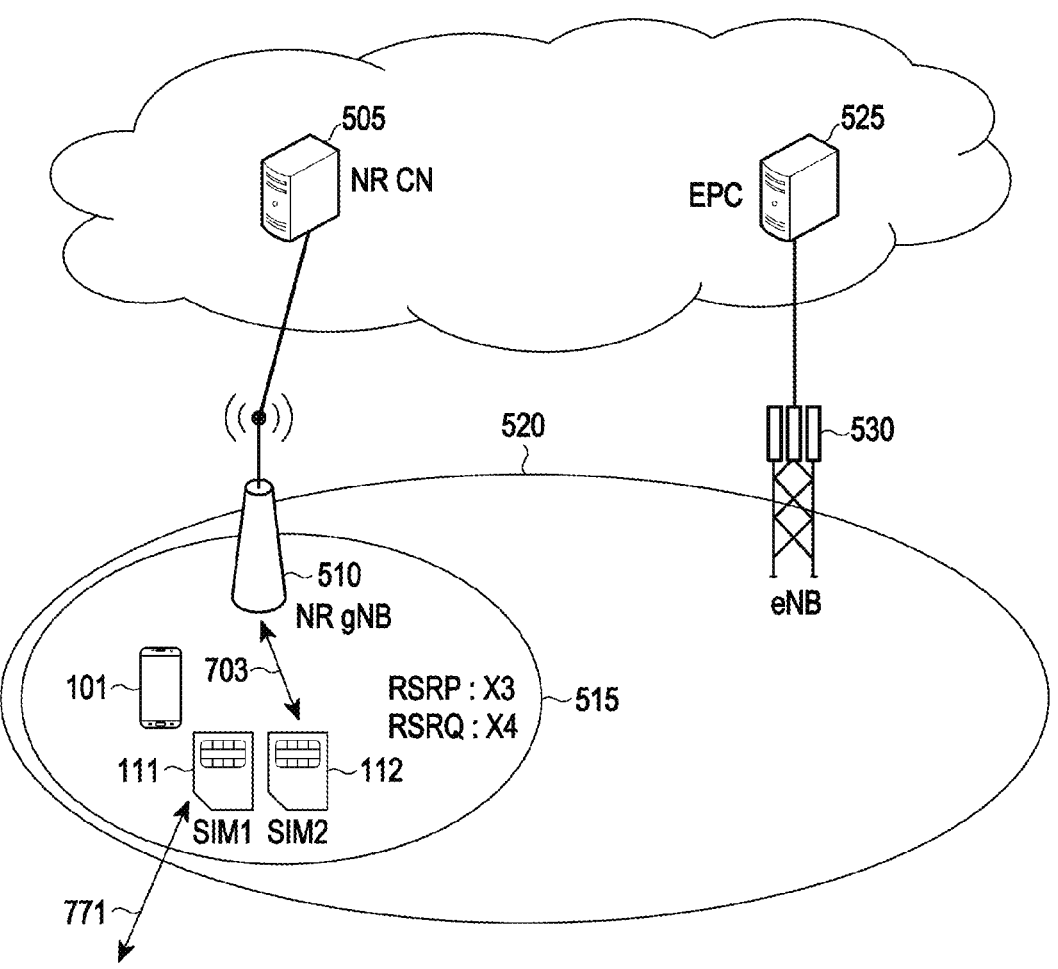
FIG. 7C illustrates an electronic device and a network according to an embodiment of the disclosure.

FIG. 6A is a flowchart illustrating an operating method of an electronic device according to an embodiment of the disclosure. The embodiment of FIG. 6A will be described with reference to FIGS. 7A to 7C. FIGS. 7A to 7C illustrate an electronic device and a network according to various embodiments.

FIG. 7A illustrates an electronic device and a network according to an embodiment of the disclosure.

FIG. 7B illustrates an electronic device and a network according to an embodiment of the disclosure.

FIG. 7C illustrates an electronic device and a network according to an embodiment of the disclosure.

In various embodiments, an operation of the electronic device 101 may mean, for example, performing an operation of the processor 120 in FIG. 1A or an operation of other hardware according to control of the processor 120, or an operation of the electronic device 101 according to execution of an instruction of a memory. The processor 120 may include the communication processor described above. The processor 120 may include, for example, a communication processor for the first RAT (e.g., LTE) and a communication processor for the second RAT (e.g., NR). Alternatively, the processor 120 may include an integrated communication for supporting both the first RAT and the second RAT.

Referring to FIGS. 6A, and 7A to 7C, according to various embodiments, in operation 601, the electronic device 101 (e.g., the processor 120) may transmit or receive Internet packet data to or from a first network corresponding to the first SIM 111, based on a first RAT, by using a first SIM (e.g., the first SIM 111 in FIG. 1B).

For example, the electronic device 101 may allocate an Internet PDN to a first protocol stack corresponding to the first SIM 111 and allocate an IMS PDN to a second protocol stack corresponding to a second SIM (e.g., the second SIM 112 in FIG. 1B). The electronic device 101 may additionally allocate the IMS PDN to the first protocol stack. For example, referring to FIG. 7A, the electronic device 101 may establish a first communication connection 771 to the first RAT (e.g., LTE) and a first network (not shown) corresponding to the first SIM 111. The electronic device 101 may transmit or receive Internet packet data and/or IMS packet data based on the first communication connection 771. The electronic device 101 may transmit or receive IMS packet data based on a second network (e.g., the eNB 530 and the EPC 525) corresponding to the second SIM 112. The electronic device 101 may establish a second communication connection 701 with the second network.

According to various embodiments, in operation 603, in case that the second SIM 112 supports the second RAT (e.g., NR), the electronic device 101 may identify that communication based on the second RAT with the second network corresponding to the second SIM 112 is executable during transmission or reception of Internet packet data to or from the first network. For example, in FIG. 7A, the electronic device 101 may identify whether communication with the second network based on the NR which is the second RAT is executable. The electronic device 101 may measure, for example, a size (e.g., reference signal received power (RSRP) and/or reference signal received quality (RSRQ)) of a signal 790 (e.g., at least one of a reference signal or a synchronization signal) from the NR-gNB 510. The electronic device 101 may identify an RSRP value of X1 and an RSRQ value of X2 with respect to the signal 790 from the NR-gNB 510 in FIG. 7A. It may be determined that the RSRP and the RSRQ do not satisfy a predetermined condition and, according thereto, the electronic device 101 may identify that communication based on the second RAT with the second network corresponding to the second SIM 112 is not executable. The electronic device 101 may continue transmitting and receiving Internet packet data through the first network corresponding to the first SIM 111.

According to various embodiments, the electronic device 101 may move into the NR coverage 515. The electronic device 101 may measure, for a size (e.g., RSRP and/or RSRQ) of at least one of a reference signal or a synchronization signal from the NR-gNB 510. The electronic device 101 may identify an RSRP value of X3 and an RSRQ value of X4 with respect to the signal 790 from the NR-gNB 510 in FIG. 7B. It may be identified that the RSRP and the RSRQ satisfy a predetermined condition, and based on this, the electronic device 101 may trigger an operation of changing connection (or enablement) of the Internet PDN. Satisfaction of the above-mentioned condition of the strength of the communication signal is an example of an event for triggering an operation of changing connection (or enablement) of the Internet PDN, and an additional example will be described below.

According to various embodiments, in operation 605, the electronic device 101 may transmit or receive Internet packet data to or from the second network corresponding to the second SIM 112, based on the second RAT (e.g., the NR). The electronic device 101 may connect the Internet PDN to the second protocol stack. The electronic device 101 may establish a communication connection 703 with the NR-gNB 510 as shown in FIG. 7C. The electronic device 101 may transmit or receive Internet packet data through the communication connection 703. The electronic device 101 may perform a connection procedure based on the second RAT and transmit or receive Internet packet data when the connection is established. In various embodiments, the transmitting or receiving Internet packet data based on the second RAT by the electronic device 101 may mean that the electronic device 101 establishes connection based on the second RAT and then transmits or receives Internet packet data. Based on, for example, the first communication connection 771, the electronic device 101 may transmit or receive IMS packet data to or from the first network based on the first RAT (e.g., LTE). According thereto, the electronic device 101 may transmit or receive Internet packet data through the NR which has a relatively high transmission or reception speed. Although it is described that the connection between the electronic device 101 and the eNB 530 is disconnected in FIG. 7C, this is merely illustrative and those skilled in the art will appreciate that connection between the electronic device 101 and the eNB 530 is maintained.

As described above, in a state in which the Internet PDN and the IMS PDN are allocated to the first protocol stack and the IMS PDN is allocated to the second protocol stack, the electronic device 101 according to various embodiments may allocate the IMS PDN to the first protocol stack according to event detection and allocate the Internet PDN and the IMS PDN to the second protocol stack. Alternatively, in another embodiment, the electronic device 101 may allocate the Internet PDN and the IMS PDN to both the first protocol stack and the second protocol stack and disable the Internet PDN with respect to the second protocol stack. Based on event detection, the electronic device 101 may enable the Internet PDN with respect to the second protocol stack and disable the Internet PDN with respect to the first protocol stack. In various embodiments, "change of Internet PDN connection" may be understood alternatively as "changing of Internet PDN enablement state."

The electronic device 101 may change connection (or allocation) of a PDU session for a $5^{th}$ generation (5G) service or change the enablement state in addition to the Internet PDN. For example, the PDU session for a 5G service may include at least one of a session for an enhanced mobile broadband (eMBB), a PDU session for ultra-reliable low latency communication (URLLC), a PDU session for a massive machine type communication (mMTC), or a separate PDU session for a specific application provided by the 5G. In various embodiments, connection (or allocation) or enablement/disablement with respect to a specific protocol stack of the Internet PDN may be substituted with connection (or allocation) or enablement/disablement with respect to a specific protocol stack of the PDU session for a 5G service.

According to various embodiments, in case that there is no difference in charge between the first SIM 111 and the second SIM 112, the electronic device 101 may be configured to perform an operation in FIG. 6A, without limitation thereto. Furthermore, it will be appreciated by those skilled in the art that in various embodiments, an operation related to the first SIM 111 and the second SIM 112 may be implemented to be related to at least two SIMs among a plurality SIMS connected to and/or embedded in the electronic device 101. Although FIGS. 7A to 7C illustrate a case in which LTE is the first RAT and NR is the second RAT, this is merely an example and there is no limitation to the type of RAT.

When it is identified that communication based on the second RAT with the second network corresponding to the second SIM is executable, the electronic device 101 according to various embodiments may transmit and receive Internet packet data to or from the second network corresponding to the second SIM based on the second RAT. Alternatively, according to identifying an additional use command, the electronic device 101 may transmit and receive Internet packet data to or from the second network corresponding to the second SIM, based on the second RAT and a description thereof will be given below.

Figure 6B:
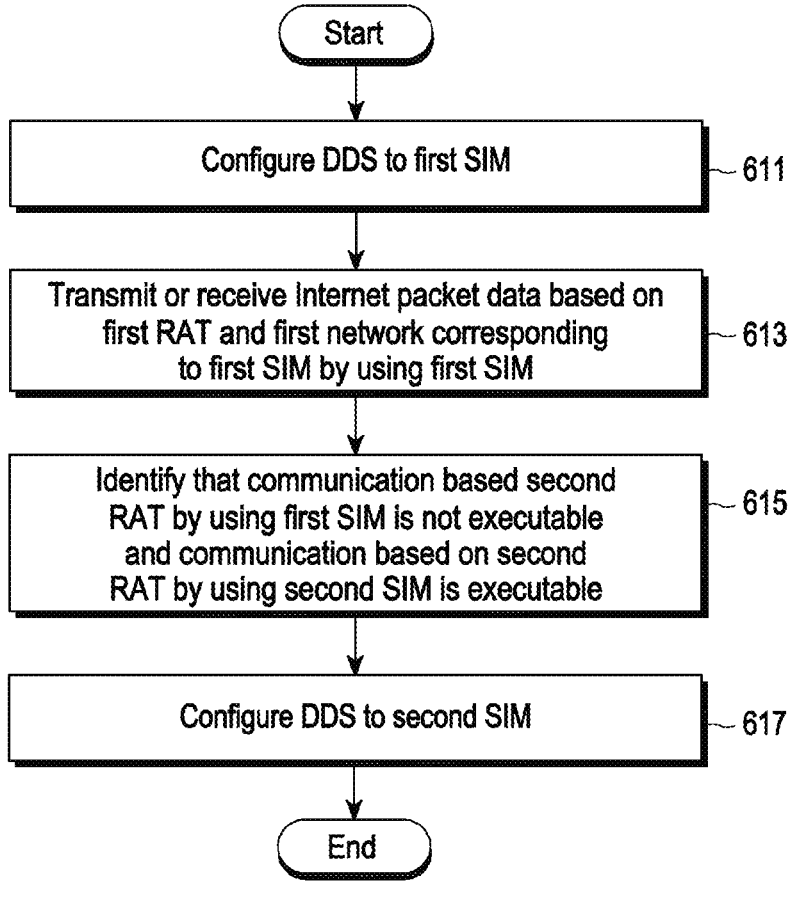
FIG. 6B is a flowchart illustrating an operating method of an electronic device according to an embodiment of the disclosure.

FIG. 6B is a flowchart illustrating an operating method of an electronic device according to an embodiment of the disclosure.

According to various embodiments, in operation 611, the electronic device 101 (e.g., the processor 120) may configure a default data subscription (or default data service, DDS) to the first SIM 111. In various embodiments, the configuring of a DDS to a specific SIM may mean configuring the specific SIM as a SIM used for transmission or reception of Internet packet data and/or connecting (or enabling) an Internet PDN to a protocol stack corresponding to the specific SIM. By way of example, the electronic device 101 may configure a DDS to the first SIM 111 by connecting an Internet PDN to the first protocol stack corresponding to the first SIM 111. By way of another example, the electronic device 101 may configure a DDS to the first SIM 111 by enabling a pre-connected Internet PDN to the first protocol stack. For example, the electronic device 101 may use a transmission or reception IP of packet data of an executing application as an IP obtained when connecting to the Internet PDN in a protocol stack, by using a routing table.

According to various embodiments, in operation 613, the electronic device 101 may transmit or receive Internet packet data to or from the first network corresponding to the first SIM 111, by using the first SIM 111, based on the first RAT. In operation 615, the electronic device 101 may identify that communication based on the second RAT using the first SIM 111 is not executable and communication based on the second RAT using the second SIM 112 is executable. In operation 617, the electronic device 101 may configure a DDS to the second SIM 112. The electronic device 101 may connect an Internet PDN to the second protocol stack corresponding to the second SIM 112. Alternatively, the electronic device 101 may enable the Internet PDN which has been disabled while being connected to the second protocol stack. Thereafter, the electronic device 101 may transmit or receive Internet packet data to or from the second network corresponding to the second SIM 112, by using the second SIM 112, based on the second RAT.

Figure 8A:
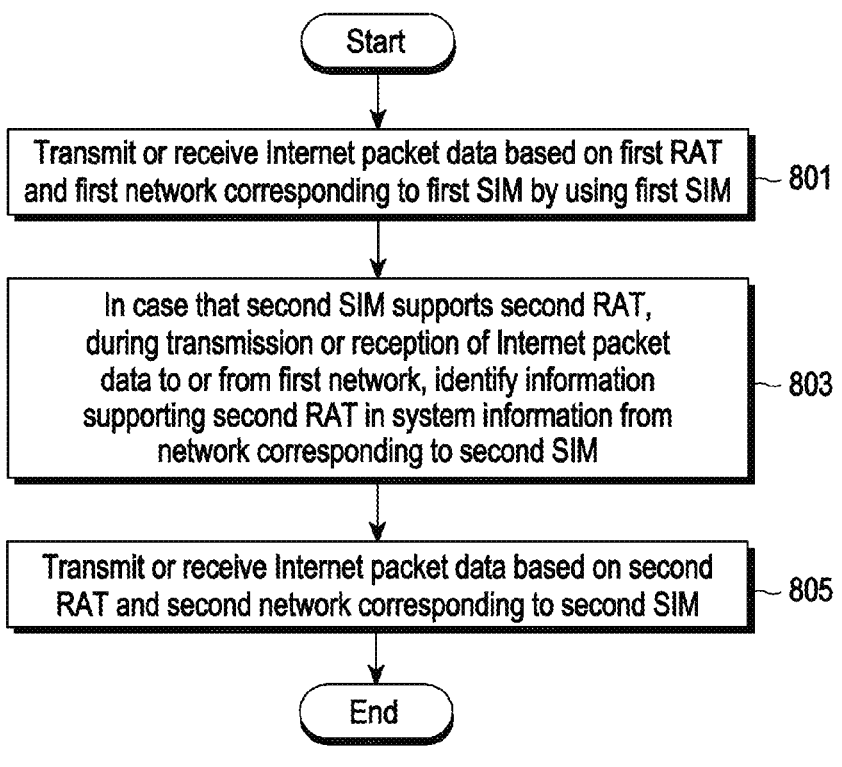
FIG. 8A is a flowchart illustrating an operating method of an electronic device according to an embodiment of the disclosure.

FIG. 8A is a flowchart illustrating an operating method of an electronic device according to an embodiment of the disclosure.

Referring to FIG. 8A, according to various embodiments, in operation 801, the electronic device 101 (e.g., the processor 120 in FIG. 1A) may transmit or receive Internet packet data to or from a first network corresponding to the first SIM 111, by using a first SIM (e.g., the first SIM 111 in FIG. 1B), based on a first RAT (e.g., LTE). For example, the electronic device 101 may connect (or allocate) an Internet PDN to a first protocol stack corresponding to the first SIM 111 or enable an Internet PDN connected to the first protocol stack. The electronic device 101 may connect (or allocate) or enable an IMS PDN to a second protocol stack corresponding to a second SIM (e.g., the second SIM 112 in FIG. 1B). Additionally, the electronic device 101 may connect (or allocate) or enable an IMS PDN to the first protocol stack as well.

According to various embodiments, in operation 803, in case that the second SIM 112 supports the second RAT (e.g., NR), the electronic device 101 may identify information supporting the second RAT (e.g., NR) from system information of a network corresponding to the second SIM 112 during transmission or reception of Internet packet data to or from the first network. For example, the electronic device 101 may receive system information (e.g., system information block (SIB) 2) from a base station (e.g., an eNB) corresponding to the second SIM 112. The electronic device 101 may identify information indicating that the corresponding base station supports the second RAT (e.g., NR) from the system information, and based on this, identify that the second RAT (e.g., NR) is available over a network corresponding to the second SIM 112.

According to various embodiments, in operation 805, based on identifying that the second RAT (e.g., NR) is available over a network corresponding to the second SIM 112, the electronic device 101 may transmit or receive Internet packet data to or from the second network corresponding to the second SIM 112, based on the second RAT (e.g., NR). For example, the electronic device 101 may connect (or allocate) an Internet PDN to a second protocol stack corresponding to the second SIM 112 or enable an Internet PDN connected to the second protocol stack. The electronic device 101 may disconnect or disable an Internet PDN to the first protocol stack corresponding to the first SIM 111.

According to various embodiments, the electronic device 101 may identify system information from the network of the first SIM 111 and system information from the network of the second SIM 112. The electronic device 101 may perform operation 805 based on identifying that the second RAT (e.g., NR) is impossible based on the system information from the network of the first SIM 111 and the second RAT (e.g., NR) is possible based on the system information of the network of the second SIM 112.

Figure 8B:
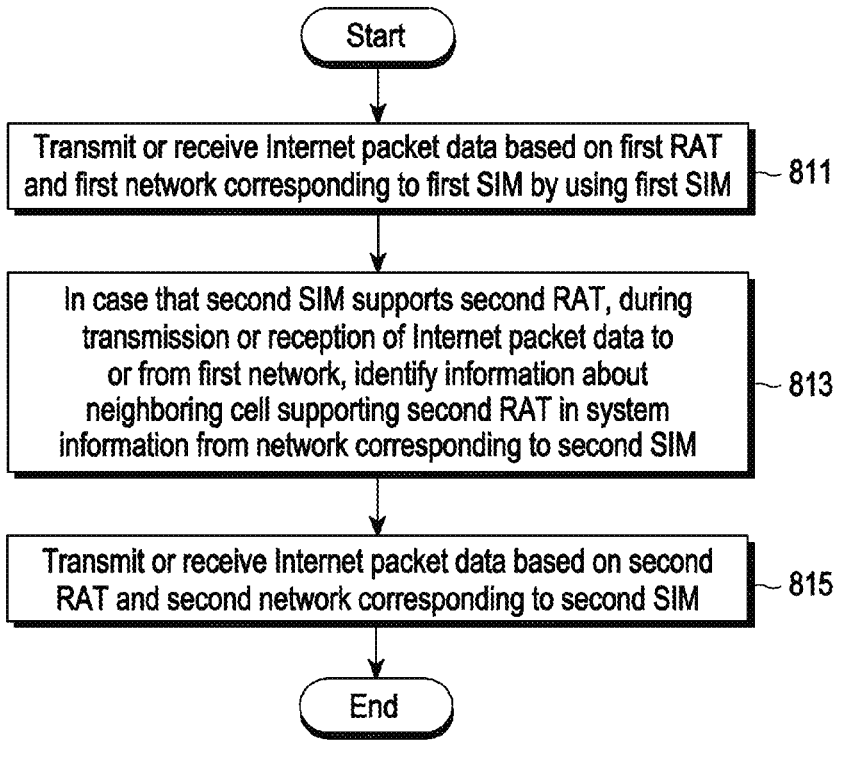
FIG. 8B is a flowchart illustrating an operating method of an electronic device according to an embodiment of the disclosure.

FIG. 8B is a flowchart illustrating an operating method of an electronic device according to an embodiment of the disclosure.

Referring to FIG. 8B, according to various embodiments, in operation 811, the electronic device 101 (e.g., the processor 120 in FIG. 1A) may transmit or receive Internet packet data to or from a first network corresponding to the first SIM 111 by using a first SIM (e.g., the first SIM 111 in FIG. 1B) based on a first RAT (e.g., LTE). For example, the electronic device 101 may connect (or allocate) an Internet PDN to a first protocol stack corresponding to the first SIM 111 or enable an Internet PDN connected to the first protocol stack. The electronic device 101 may connect (or allocate) or enable an IMS PDN to a second protocol stack corresponding to a second SIM (e.g., the second SIM 112 in FIG. 1B). Additionally, the electronic device 101 may connect (or allocate) or enable an IMS PDN to the first protocol stack as well.

According to various embodiments, in operation 813, in case that the second SIM 112 supports the second RAT, the electronic device 101 may identify information about a neighbor cell supporting the second RAT (e.g., NR) from system information of a network corresponding to the second SIM 112 during transmission or reception of Internet packet data to or from the first network. For example, the electronic device 101 may receive system information (e.g., SIB24) from a base station (e.g., eNB) corresponding to the second SIM 112 and identify whether there is information about a neighbor cell supporting NR from the system information. There is no limitation on the type of system information. In case that there is a neighbor cell supporting NR, the electronic device 101 may identify that the second RAT (e.g., NR) is available over a network corresponding to the second SIM 112 from the system information.

According to various embodiments, in operation 815, based on identifying that the second RAT (e.g., NR) is available over a network corresponding to the second SIM 112, the electronic device 101 may transmit or receive Internet packet data to or from the second network corresponding to the second SIM 112, based on the second RAT (e.g., NR). For example, the electronic device 101 may connect (or allocate) an Internet PDN to a second protocol stack corresponding to the second SIM 112 or enable an Internet PDN connected to the second protocol stack. The electronic device 101 may disconnect or disable an Internet PDN to the first protocol stack corresponding to the first SIM 111.

According to various embodiments, the electronic device 101 may identify system information from the network of the first SIM 111 and system information from the network of the second SIM 112. The electronic device 101 may perform operation 815 based on identifying that there is not neighbor cell supporting the second RAT (e.g., NR) based on the system information from the network of the first SIM 111 and there is a neighbor cell supporting the second RAT (e.g., NR) based on the system information of the network of the second SIM 112.

Figure 8C:
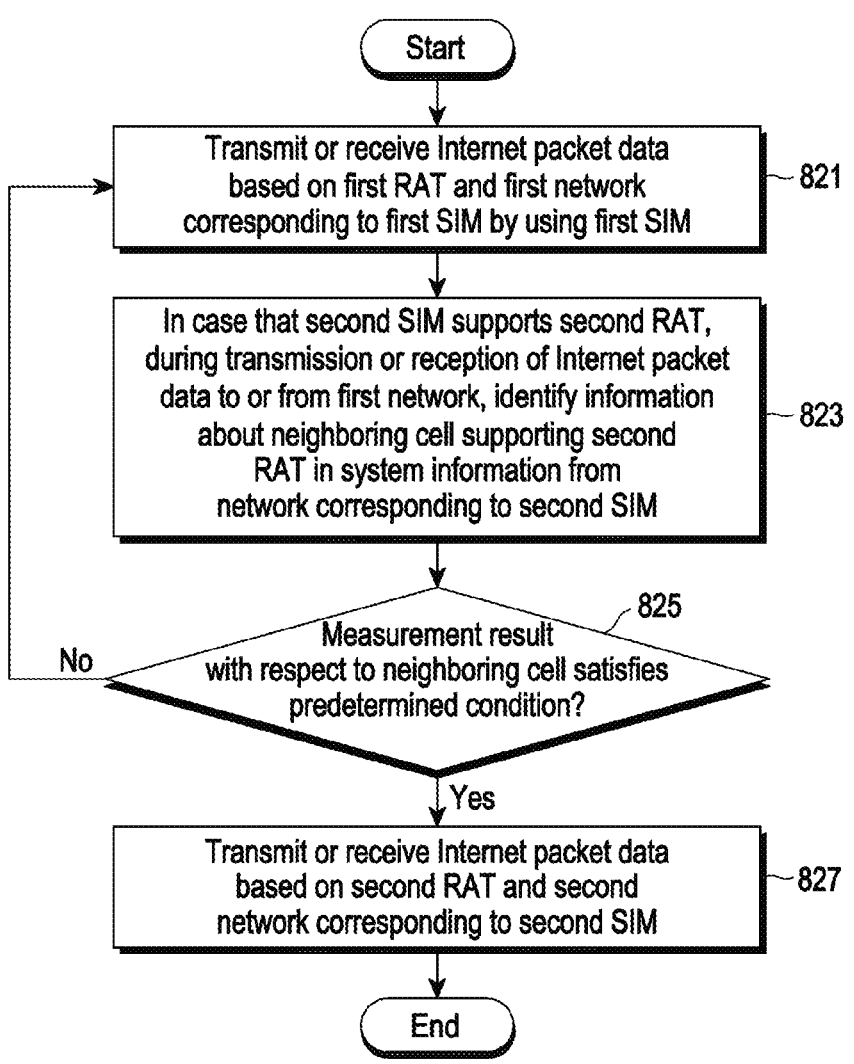
FIG. 8C is a flowchart illustrating an operating method of an electronic device according to an embodiment of the disclosure.

FIG. 8C is a flowchart illustrating an operating method of an electronic device according to an embodiment of the disclosure.

Referring to FIG. 8C, according to various embodiments, in operation 821, the electronic device 101 (e.g., the processor 120 in FIG. 1A) may transmit or receive Internet packet data a first network corresponding to the first SIM 111, by using a first SIM (e.g., the first SIM 111 in FIG. 1B), based on a first RAT (e.g., LTE). In operation 823, in case that a second SIM (e.g., the second SIM 112 in FIG. 1B) supports a second RAT, the electronic device 101 may identify information about a neighbor cell supporting the second RAT (e.g., NR) from system information of a network corresponding to the second SIM 112 during transmission or reception of Internet packet data to or from the first network.

According to various embodiments, when the electronic device 101 identifies that there is a neighbor cell supporting NR from the system information, the electronic device 101 may identify whether a measurement result with respect to the neighbor cell satisfies a predetermined condition in operation 825. The electronic device 101 may measure information (e.g., RSRP and/or RSRQ) with respect to a size a reference signal and/or a synchronization signal from the neighbor cell. For example, the electronic device 101 may perform the measurement based on, but without limitation, a combined signal from an antenna element (e.g., at least one element of an antenna) corresponding to a given receiver branch or power distribution at a reference point (e.g., an antenna port). As at least a portion of an operation of identifying whether a measurement result satisfies a predetermined condition, the electronic device 101 may identify whether a measurement result satisfies a cell selection condition but the cell selection condition a merely example of the predetermined condition, without limitation. For example, when NR is used as a SA, the electronic device 101 may perform operation 825, without limitation, and may perform operation 825 in an NSA.

According to various embodiments, when it is identified that the measurement result with respect to the neighbor cell does not satisfy the predetermined condition (825-No), the electronic device 101 may maintain transmission or reception of Internet packet data based on the first SIM 111. When it is identified that the measurement result with respect to the neighbor cell satisfies the predetermined condition (825-Yes), the electronic device 101 may transmit or receive Internet packet data to or from the second network corresponding to the second SIM 112 based on the second RAT in operation 827. For example, the electronic device 101 may connect (or allocate) an Internet PDN to a second protocol stack corresponding to the second SIM 112 or enable an Internet PDN connected to the second protocol stack. The electronic device 101 may disconnect or disable an Internet PDN to the first protocol stack corresponding to the first SIM 111.

According to various embodiments, the electronic device 101 may identify whether each of a measurement result with respect to the network of the first SIM 111 and a measurement result with respect to the network of the second SIM 112 satisfies a predetermined condition. The electronic device 101 may perform operation 827 based on that the measurement result with respect to the network of the first SIM 111 does not satisfy a predetermined condition and the measurement result with respect to the network of the second SIM 112.

Figure 8D:
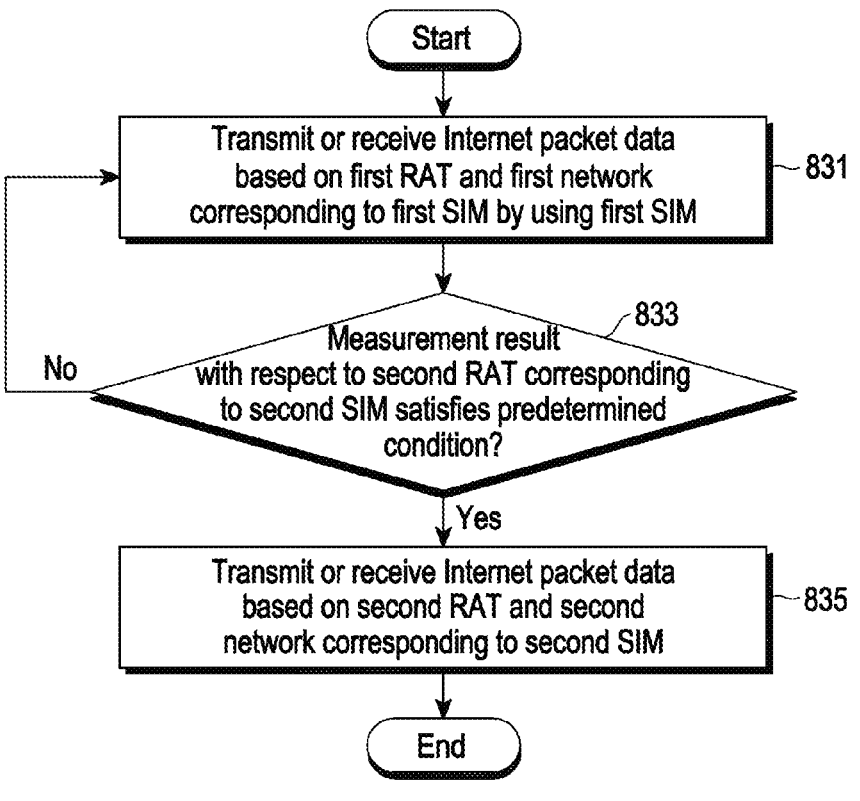
FIG. 8D is a flowchart illustrating an operating method of an electronic device according to an embodiment of the disclosure.

FIG. 8D is a flowchart illustrating an operating method of an electronic device according to an embodiment of the disclosure.

Referring to FIG. 8D, according to various embodiments, in operation 831, the electronic device 101 (e.g., the processor 120 in FIG. 1A) may transmit or receive Internet packet data to or from a first network (e.g., LTE) corresponding to the first SIM 111 by using a first SIM (e.g., the first SIM 111 in FIG. 1B) based on a first RAT. In operation 833, the electronic device 101 may identify whether a measurement result with respect to the second RAT corresponding to the second SIM 112 satisfies a predetermined condition. Even in case that information about a neighbor cell has not been identified from the system information, the electronic device 101 may perform measurement at a frequency (e.g., a frequency that can be supported by the electronic device 101 at the second RAT) of the second RAT. As at least a portion of an operation of identifying whether a measurement result satisfies a predetermined condition, the electronic device 101 may identify whether a measurement result satisfies a cell selection condition but the cell selection condition a merely example of the predetermined condition, without limitation.

According to various embodiments, when it is identified that the measurement result does not satisfy the predetermined condition (833-No), the electronic device 101 may maintain transmission or reception of Internet packet data based on the first SIM 111. When it is identified that the measurement result satisfies the predetermined condition (833-Yes), the electronic device 101 may transmit or receive Internet packet data to or from a second network corresponding to a second SIM (e.g., the second SIM 112 in FIG. 1B) based on a second RAT in operation 835. For example, the electronic device 101 may connect (or allocate) an Internet PDN to a second protocol stack corresponding to the second SIM 112 or enable an Internet PDN connected to the second protocol stack. The electronic device 101 may disconnect or disable an Internet PDN to the first protocol stack corresponding to the first SIM 111.

According to various embodiments, the electronic device 101 may identify whether each of a measurement result with respect to the network of the first SIM 111 and a measurement result with respect to the network of the second SIM 112 satisfies a predetermined condition. The electronic device 101 may perform operation 835 based on that the measurement result with respect to the network of the first SIM 111 does not satisfy a predetermined condition and the measurement result with respect to the network of the second SIM 112.

Figure 8E:
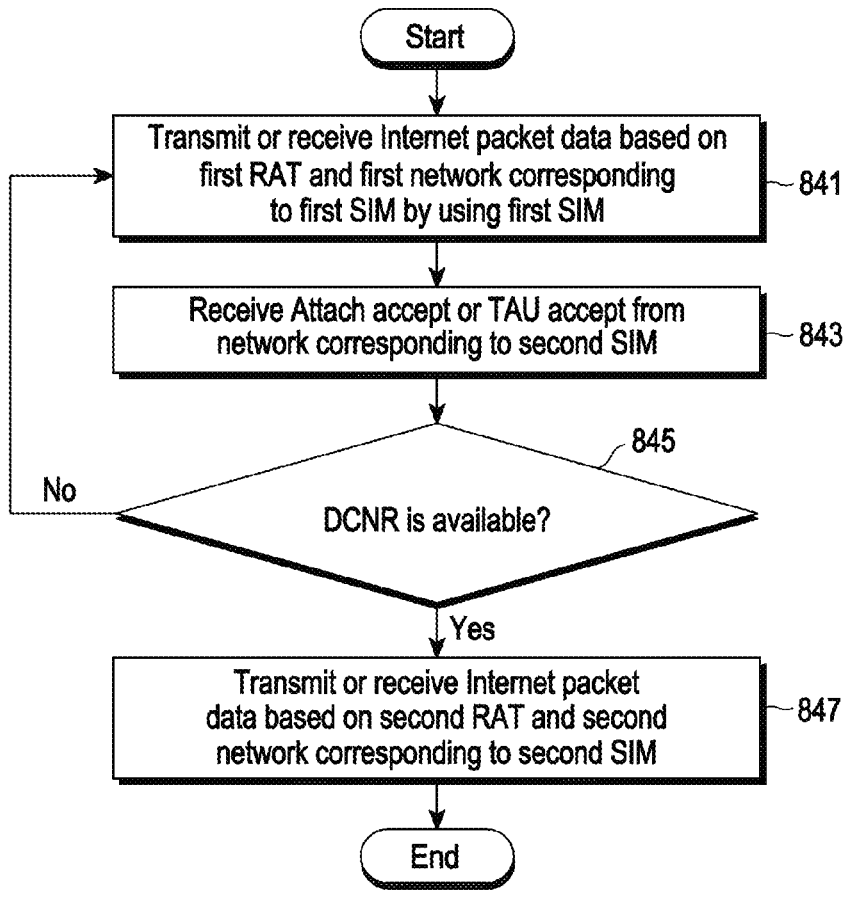
FIG. 8E is a flowchart illustrating an operating method of an electronic device according to an embodiment of the disclosure.

FIG. 8E is a flowchart illustrating an operating method of an electronic device according to an embodiment of the disclosure.

According to various embodiments, in operation 841, the electronic device 101 (e.g., the processor 120 in FIG. 1A) may transmit or receive Internet packet data to or from a first network corresponding to the first SIM 111, by using a first SIM (e.g., the first SIM 111 in FIG. 1B), based on and a first RAT (e.g., LTE). In operation 843, the electronic device 101 may receive an attach accept message or a tracking area update accept (TAU accept) message from a network corresponding to a second SIM (e.g., the second SIM 112 in FIG. 1B). In operation 845, the electronic device 101 may identify whether Dual-Connectivity with New Radio (DCNR) is available through the network corresponding to the second SIM 112. For example, the electronic device 101 may identify whether dual connectivity (DC) including NR is available through the second SIM 112, based on a flag value in the message. For example, the electronic device 101 may identify a Restrict DCNR flag value included in the attach accept message or the TAU accept message, and identify whether the network corresponding to the second SIM 112 supports DCNR, based on the determination result.

According to various embodiments, when it is identified that the network corresponding to the second SIM 112 does not support DCNR (845-No), the electronic device 101 may maintain transmission or reception of Internet packet data based on the first SIM 111. When it was identified that the measurement result satisfies the predetermined condition (845-Yes), the electronic device 101 may transmit or receive Internet packet data to or from the second network corresponding to the second SIM 112 based on the second RAT in operation 847. For example, the electronic device 101 may connect (or allocate) an Internet PDN to a second protocol stack corresponding to the second SIM 112 or enable an Internet PDN connected to the second protocol stack. The electronic device 101 may disconnect or disable an Internet PDN to the first protocol stack corresponding to the first SIM 111.

According to various embodiments, the electronic device 101 may identify whether the network of the first SIM 111 supports DCNR and the network of the second SIM 112 supports DCNR. The electronic device 101 may perform operation 847 based on that the network of the first SIM 111 does not support DCNR and the network of the second SIM 112 supports DCNR.

Figure 8F:
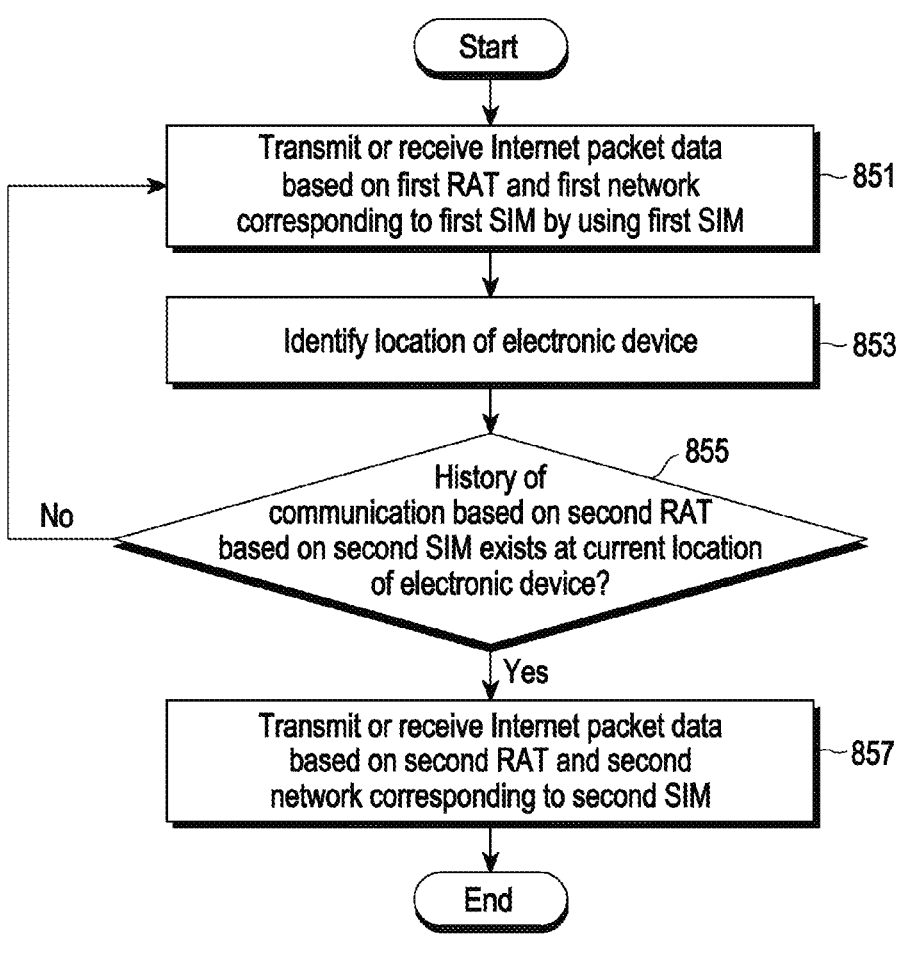
FIG. 8F is a flowchart illustrating an operating method of an electronic device according to an embodiment of the disclosure.

FIG. 8F is a flowchart illustrating an operating method of an electronic device according to an embodiment of the disclosure.

Referring to FIG. 8F, according to various embodiments, in operation 851, the electronic device 101 (e.g., the processor 120 in FIG. 1A) may transmit or receive Internet packet data a first network corresponding to the first SIM 111 by using a first SIM (e.g., the first SIM 111 in FIG. 1B) based on a first RAT (e.g., LTE). The electronic device 101 may identify a location of the electronic device 101 in operation 853. For example, the electronic device 101 may identify a location based on at least one of a network cell ID, a network reception field state, a WiFi ID, a WiFi field state, or GPS information, but there is no limitation on a method for identifying a location. In operation 855, the electronic device 101 may identify whether there is a history of communication based on a second RAT, based on a second SIM (e.g., the second SIM 112 in FIG. 1B) at a current location. For example, in the electronic device 101, a history of communication based on the second RAT may be store in the memory 130 and may be loaded by the processor 120 (e.g., an application processor and/or a communication processor) to be used. When there is no history of communication based on the second RAT, based on the second SIM 112 at a current location (855-No), the electronic device 101 may maintain transmission or reception of Internet packet data based on the first SIM 111. When there is a history of communication based on the second RAT, based on the second SIM 112 at a current location (855-Yes), the electronic device 101 may transmit or receive Internet packet data to or from the second network corresponding to the second SIM 112 based on the second RAT in operation 857. For example, the electronic device 101 may connect (or allocate) an Internet PDN to a second protocol stack corresponding to the second SIM 112 or enable an Internet PDN connected to the second protocol stack. The electronic device 101 may disconnect or disable an Internet PDN to the first protocol stack corresponding to the first SIM 111.

According to various embodiments, the electronic device 101 may identify whether there is a history of communication based on the second RAT, based on the first SIM 111 at a current location and identify whether there is a history of communication based on the second RAT, based on the second SIM 112 at a current location. The identifying by the electronic device 101 of whether there is a history of communication at a current location may mean identifying of whether there is a history of communication within a predetermined sized region including the current location. When there is no history of communication based on the second RAT, based on the first SIM 111 at a current location and there is a history of communication based on the second RAT, based on the second SIM 112 at a current location, the electronic device 101 may perform operation 857.

In another example, the electronic device 101 may identify a current location and inquire of a server (e.g., a location/communication coverage management server) whether communication of the second RAT based on the second SIM 112 at a current location. The server may manage information about a location of communication coverage of the second RAT based on the second SIM 112. When information about a current location is received from the electronic device 101, the server may identify whether the current location is included in the communication coverage of the second RAT. The server may return whether the electronic device 101 is capable of performing communication of the second RAT at the current location to the electronic device 101. The electronic device 101 may determine whether second RAT communication based on the second SIM 112 is executable at the current location, based on the information returned from the server. If it is identified that second RAT communication based on the second SIM 112 is executable, the electronic device 101 may configure a DDS to the second SIM 112.

In another example, the electronic device 101 may download information about coverage of second RAT communication based on the second SIM 112 with respect to a predetermined region including the current location. Based on the download information about coverage of the second RAT communication within a predetermined region, the electronic device 101 may determine whether the current location is included in the second RAT communication coverage. If it is identified that second RAT communication based on the second SIM 112 is executable, the electronic device 101 may configure a DDS to the second SIM 112.

According to various embodiments, based on one of FIGS. 8A to 8F or a combination thereof, the electronic device 101 may identify whether communication based on the second RAT with the second network corresponding to the second SIM 112 is executable. The electronic device 101 may periodically identify communication based on the second RAT with the second network corresponding to the second SIM 112 is executable or identify whether communication based on the second RAT is executable according to detection of a specific event. For example, the electronic device 101 may identify whether communication based on the second RAT is executable when an initial network is registered based on a SIM, a serving cell is changed, an electric field condition of a serving sell is changed, an RRC state is changed (e.g., changing from RRC idle to RRC connected), or data service requiring a high data rate is used.

Figure 9:
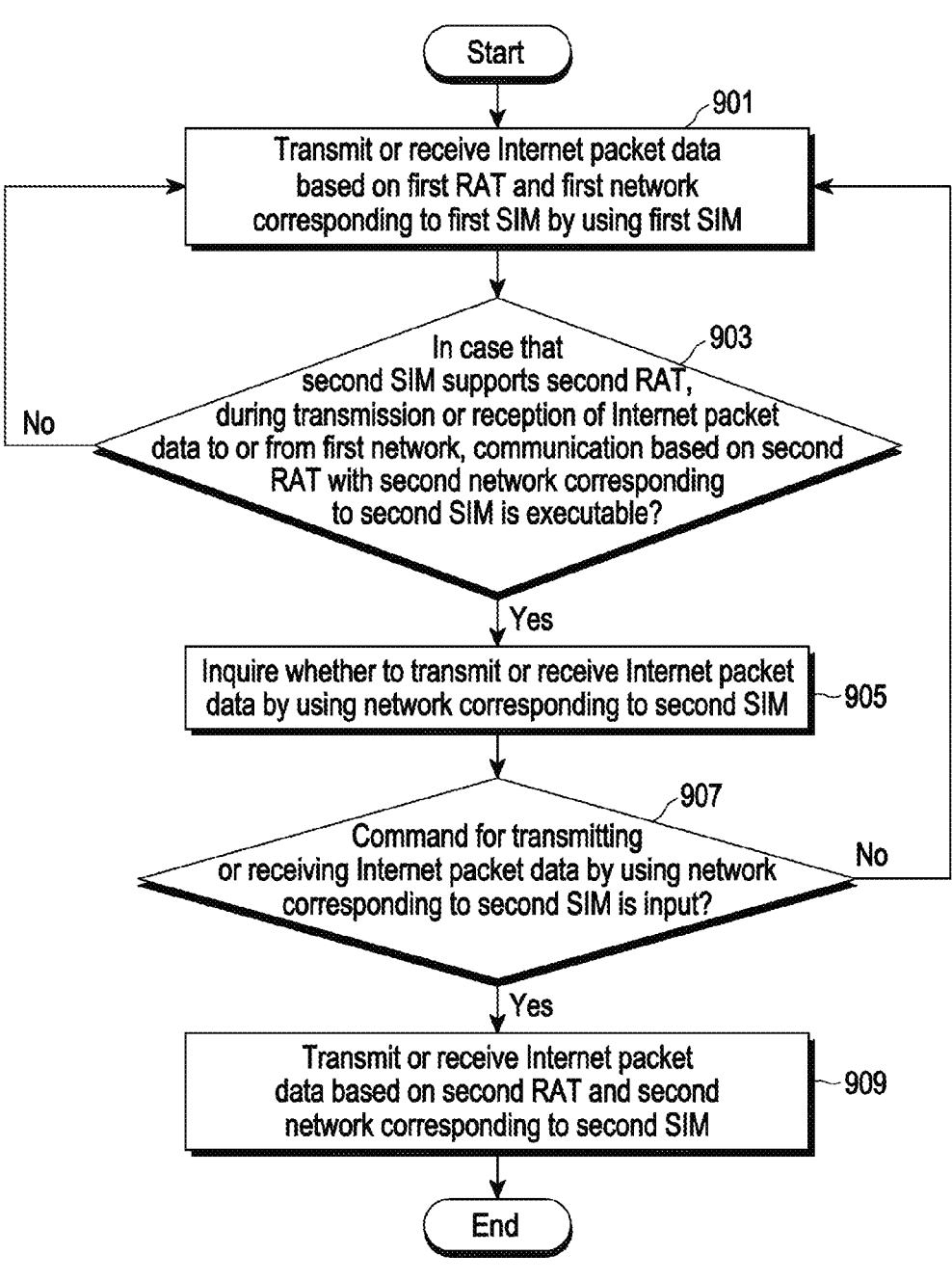
FIG. 9 is a flowchart illustrating an operating method of an electronic device according to an embodiment of the disclosure.

FIG. 9 is a flowchart illustrating an operating method of an electronic device according to an embodiment of the disclosure. The embodiment in FIG. 9 will be described with reference to FIGS. 10A and 10B.

Figure 10A:
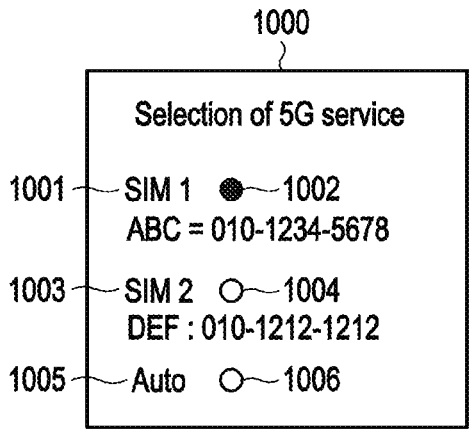
FIG. 10A illustrates a screen displayed on an electronic device according to an embodiment of the disclosure.
Figure 10B:
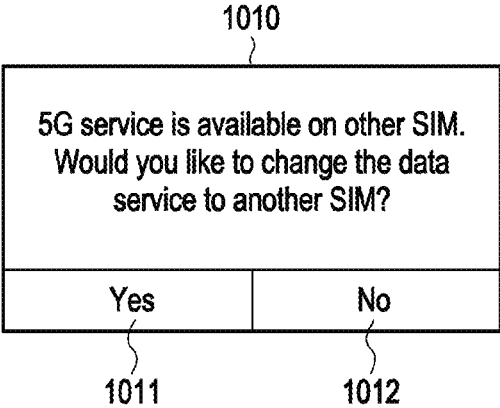
FIG. 10B illustrates a screen displayed on an electronic device according to an embodiment of the disclosure.

FIGS. 10A and 10B illustrate a screen displayed on an electronic device according to various embodiments of the disclosure.

Referring to FIGS. 9, 10A, and 10B, according to various embodiments, in operation 901, the electronic device 101 (e.g., the processor 120 in FIG. 1A) may transmit or receive Internet packet data to or from a first network corresponding to the first SIM 111, by using a first SIM (e.g., the first SIM 111 in FIG. 1B), based on a first RAT (e.g., LTE). In operation 903, in case that a second SIM (e.g., the second SIM 112 in FIG. 1B) support a second RAT, the electronic device 101 may identify whether communication based on the second RAT with a second network corresponding to the second SIM 112 is executable during transmission or reception of Internet packet data to or from the first network. For example, based on at least one method of FIGS. 8A to 8F, the electronic device 101 may identify whether communication based on the second RAT with the second network corresponding to the second SIM 112 is executable. When it is identified that communication based on the second RAT with the second network corresponding to the second SIM 112 is not executable (903-No), the electronic device 101 may maintain transmission or reception of Internet packet data based on the first SIM 111.

According to various embodiment, when it is identified that communication based on the second RAT with the second network corresponding to the second SIM 112 is executable (903-No), the electronic device 101 may inquire whether to transmit or receive Internet packet data by using the network corresponding to the second SIM 112 in operation 905. In operation 907, the electronic device 101 may identify whether a command to transmit or receive Internet packet data by using the network corresponding to the second SIM 112 is input.

For example, the electronic device 101 may display a screen 1000 as shown in FIG. 10A. The screen 1000 may include a message (e.g., selection of 5G service) indicating selection of a 5G service, a text 1001 indicating a first SIM, an indicator 1002 indicating selection of the first SIM, a text 1003 indicating a second SIM, an indicator 1004 indicating selection of the second SIM, a text 1005 indicating auto configuration, and an indicator 1006 indicating selection of auto configuration. The text 1001 indicating the first SIM may include at least one of an identifier of the first SIM, a supporting communication service provider (e.g., "ABC"), or a phone number (e.g., "010-1234-5678"). The text 1003 indicating the second SIM may include at least one of an identifier of the second SIM, a supporting communication service provider (e.g., "DEF"), or a phone number (e.g., "010-1212-1212"). For example, the message indicating selection of the 5G service may be substituted with a message for selecting a SIM to transmit or receive data. Currently, the DDS is configured to the first SIM 111, and thus it may be displayed that the indicator 1002 indicating selection of the first SIM is enabled. If one of the text 1003 indicating the second SIM or the indicator 1004 indicating selection of the second SIM is selected, the electronic device 101 may identify that a command to transmit or receive Internet packet data by using the network corresponding to the second SIM 112 is input. If the text 1005 indicating auto configuration or the indicator 1006 indicating selection of auto configuration is selected, the electronic device 101 may automatically perform later Internet PDN connection change (or DDS configuration) without additional identification from a user.

For another example, the electronic device 101 may display a screen 1010 as shown in FIG. 10B. The screen 1010 may include a text indicating that a 5G service is available through another SIM and inquiring a change, a UI 1011 configured to indicate a change, and a UI 1012 configured to indicate to maintain a current state. When the UI 1011 configured to indicate a change is selected, the electronic device 101 may identify that a command to transmit or receive Internet packet data by using the network corresponding to the second SIM 112 is input. When a UI 1012 configured to indicate to maintain a current state is selected, the electronic device 101 may maintain the DDS configuration with respect to the first SIM 111.

According to various embodiments, when a command for transmitting or receiving Internet packet data by using the network corresponding to the second SIM 112 is not input (907-No), the electronic device 101 may maintain the DDS configuration with respect to the first SIM 111. When a command for transmitting or receiving Internet packet data by using the network corresponding to the second SIM 112 is input (907-Yes), the electronic device 101 may transmit or receive Internet packet data to or from the second network corresponding to the second SIM 112 based on the second RAT in operation 909. For example, the electronic device 101 may connect (or allocate) an Internet PDN to a second protocol stack corresponding to the second SIM 112 or enable an Internet PDN connected to the second protocol stack. The electronic device 101 may disconnect or disable an Internet PDN to the first protocol stack corresponding to the first SIM 111.

Figure 11:
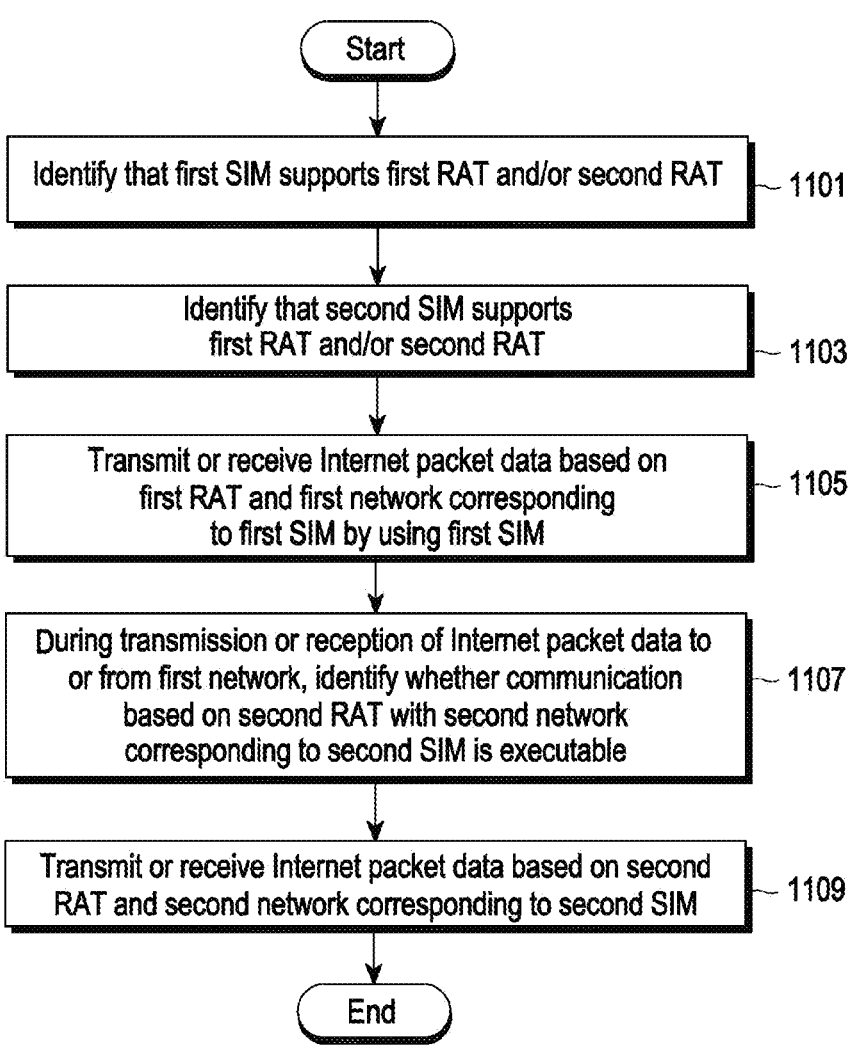
FIG. 11 is a flowchart illustrating an operating method of an electronic device according to an embodiment of the disclosure.

FIG. 11 is a flowchart illustrating an operating method of an electronic device according to an embodiment of the disclosure.

Referring to FIG. 11, according to various embodiments, in operation 1101, the electronic device 101 (e.g., the processor 120 in FIG. 1A) may identify that a first SIM (e.g., the first SIM 111 in FIG. 1B) supports a first RAT (e.g., LTE) and/or a second RAT (e.g., NR). The electronic device 101 may identify that a second SIM (e.g., the second SIM 112 in FIG. 1B) supports the first RAT and/or the second RAT in operation 1103.

For example, the electronic device 101 may identify whether the first RAT (e.g., LTE) and/or the second RAT (e.g., NR) is supported, based on information stored in the first SIM 111 and/or the second SIM 112. For example, whether the second RAT (e.g., NR) is supported is identified based on whether contents of files at the DF 5GS level defined in 3rd generation partnership project (3GPP) technical specification (TS) 31.102 is stored in a SIM. There are location information fields defined for respective access technologies, and an EF_5GS3GPPLOCI field among the fields may store a 5G-GUTI, TAI, and an update state value used when the last network registration is completed in the 5G 3GPP network. The electronic device 101 may identify whether NR is supported by a SIM, based on information of the corresponding field. The electronic device 101 may determine whether a SIM supports a specific RAT, based on at least one parameter defined by the standard (e.g., section 4.4.11 in 3GPP TS 31.102).

For another example, the electronic device 101 may identify information of a supported RAT for each SIM, based on information on included hardware and/or information on stored software. For example, the electronic device 101 may identify whether the corresponding SIM supports NR based on whether a NR band is supported in RF related software. For example, the electronic device 101 may identify whether the NR is included in a RAT supported by the SIM, based on operator information (e.g., PLMN information) or a roaming state. The electronic device 101 may identify a RAT supporting a specific SIM, based on at least a portion of information identified for UE capability report.

According to various embodiments, in operation 1105, the electronic device 101 may transmit or receive Internet packet data to or from the first network corresponding to the first SIM 111, by using the first SIM 111, based on the first RAT. In operation 1107, the electronic device 101 may identify that communication based on the second RAT with the second network corresponding to the second SIM 112 is executable during transmission or reception of Internet packet data to or from the first network. For example, based on at least one method of FIGS. 8A to 8F, the electronic device 101 may identify that communication based on the second RAT with the second network corresponding to the second SIM 112 is executable. In operation 1109, the electronic device 101 may transmit or receive Internet packet data to or from the second network corresponding to the second SIM 112, based on the second RAT. For example, according to identifying that the second SIM 112 supports the second RAT and communication based on the second RAT by using the network corresponding to the second SIM 112 is executable, the electronic device 101 may transmit or receive Internet packet data to or from the second network corresponding to the second SIM 112, based on the second RAT.

Figure 12:
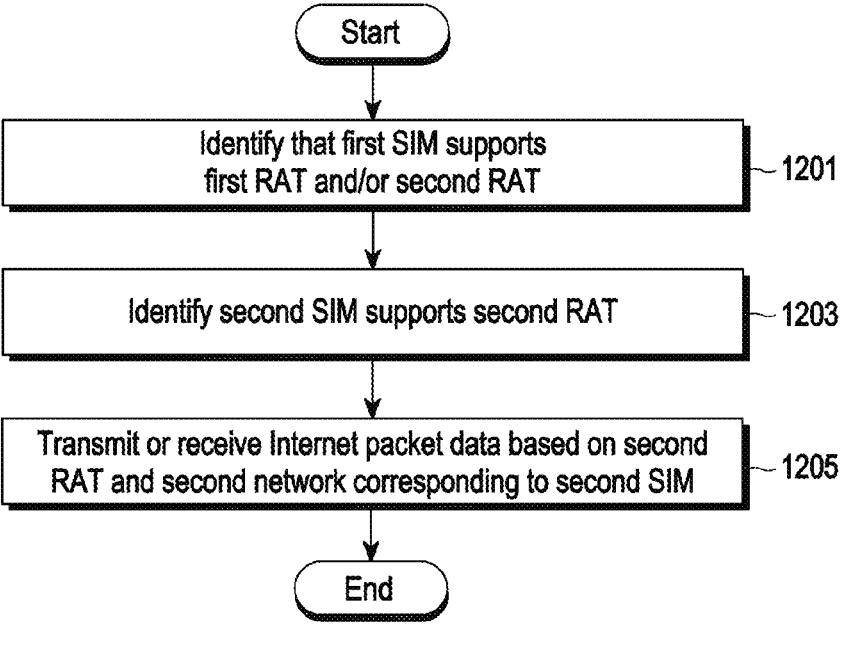
FIG. 12 is a flowchart illustrating an operating method of an electronic device according to an embodiment of the disclosure.

FIG. 12 is a flowchart illustrating an operating method of an electronic device according to an embodiment of the disclosure.

Referring to FIG. 12, according to various embodiments, in operation 1201, the electronic device 101 (e.g., the processor 120 in FIG. 1A) may transmit or receive Internet packet data to or from a first network corresponding to the first SIM 111, by using a first SIM (e.g., the first SIM 111 in FIG. 1B), based on a first RAT. In operation 1203, the electronic device 101 may identify that a second SIM (e.g., the second SIM 112 in FIG. 1B) supports a second RAT. For example, the electronic device 101 may identify that the second SIM 112 supports the second RAT, based on information stored in the second SIM 112. Alternatively, the electronic device 101 may identify that the second SIM 112 supports the second RAT, based on information of included hardware and/or information of stored software. In operation 1205, the electronic device 101 may transmit or receive Internet packet data to or from the second network corresponding to the second SIM 112, based on the second RAT. For example, the electronic device 101 may connect (or allocate) an Internet PDN to a second protocol stack corresponding to the second SIM 112 or enable an Internet PDN connected to the second protocol stack. The electronic device 101 may disconnect or disable an Internet PDN to the first protocol stack corresponding to the first SIM 111.

Figures 13, 14:
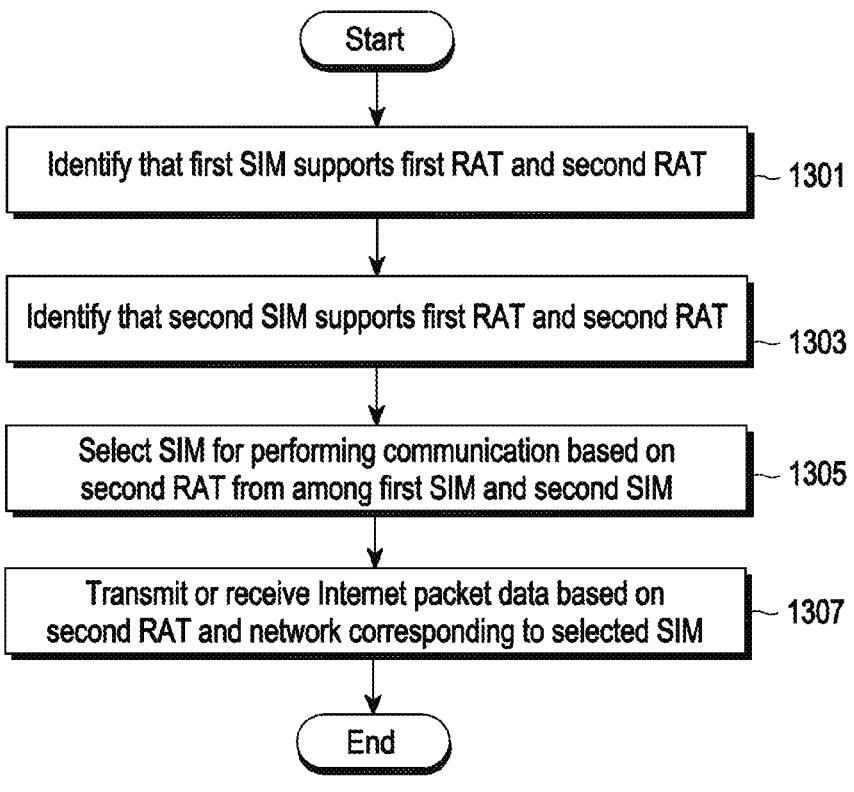
FIG. 13 is a flowchart illustrating an operating method of an electronic device according to an embodiment of the disclosure.
FIG. 14 illustrates a screen displayed on an electronic device according to an embodiment of the disclosure.

FIG. 13 is a flowchart illustrating an operating method of an electronic device according to an embodiment of the disclosure.

FIG. 14 illustrates a screen displayed on an electronic device according to an embodiment of the disclosure.

Referring to FIG. 13, according to various embodiments, in operation 1301, the electronic device 101 (e.g., the processor 120 in FIG. 1A) may identify that a first SIM (e.g., the first SIM 111 in FIG. 1B) supports a first RAT and a second RAT. In operation 1303, the electronic device 101 may identify that a second SIM (e.g., the second SIM 112 in FIG. 1B) supports the first RAT and the second RAT. The electronic device 101 may identify that both the first SIM 111 and the second SIM 112 support the second RAT.

Referring to FIG. 13, according to various embodiments, in operation 1305, the electronic device 101 may select a SIM for performing communication based on the second RAT from among the first SIM 111 and the second SIM 112. In operation 1307, the electronic device 101 may transmit or receive Internet packet data to or from a network corresponding to the selected SIM, based on the second RAT. For example, the electronic device 101 may connect (or allocate) an Internet PDN to a protocol stack corresponding to the selected SIM, or enable a pre-connected Internet PDN. Alternatively, the electronic device 101 may connect (or allocate), to a protocol stack corresponding to the selected SIM, other PDU sessions (e.g., at least one of a session for an enhanced mobile broadband (eMBB), a PDU session for ultra-reliable low latency communication (URLLC), a PDU session for a massive machine type communication (mMTC), or a separate PDU session for a specific application provided by the 5G) for a 5G service, or enable a pre-connected PDU session. Alternatively, the electronic device 101 may connect (or allocate) at least one PDU for a 5G service to a protocol stack corresponding to the selected SIM, or enable a pre-connected PDU session. In operation 1307, the electronic device 101 may transmit or receive data related to the second RAT including Internet packet data based on the second RAT.

For example, the electronic device 101 may select a SIM for performing communication based on the second RAT (e.g., NR) without selection from a user. Alternatively, the electronic device 101 may select a SIM for performing communication based on the second RAT (e.g., NR) based on selection from a user. For example, the electronic device 101 may display the screen 1000 as shown in FIG. 10A, and cause a SIM to be used for a 5G service to be selected based on selection from a user. Alternatively, the electronic device 101 may display a screen 1420 as shown in FIG. 14.

Referring to FIG. 14, the screen 1420 may include a text indicating that whether to enable/disable the service is selectable and an interface configured to toggle enablement 1421 or disablement 1422. The electronic device 101 may be selected to enable or disable a 5G service for the entire electronic device 101 and when the 5G service is enabled, may automatically select a SIM to be used for the 5G service.

Figure 15:
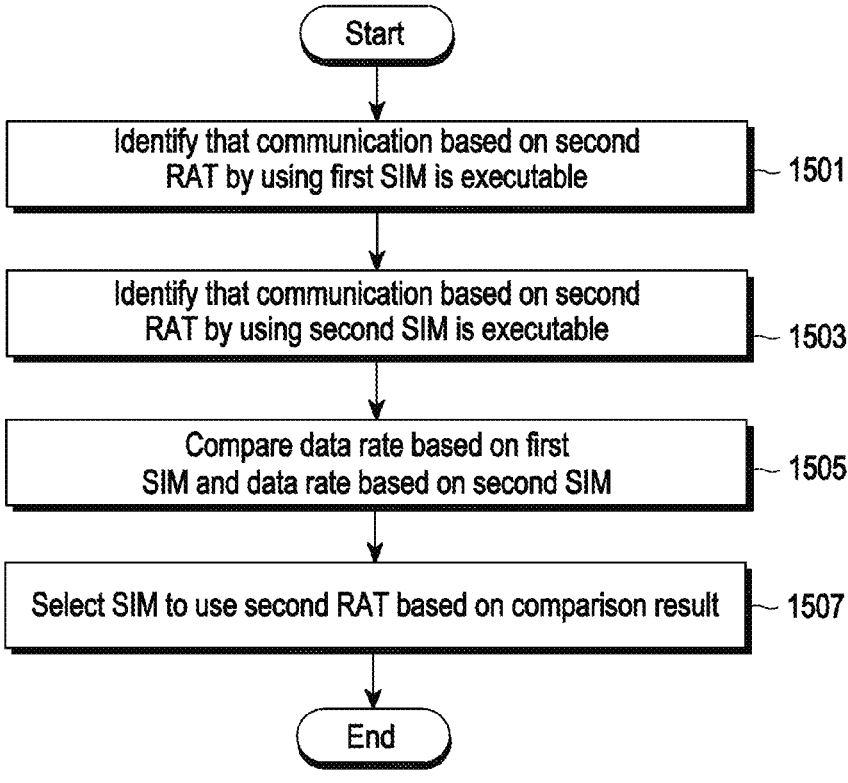
FIG. 15 is a flowchart illustrating an operating method of an electronic device according to an embodiment of the disclosure.

FIG. 15 is a flowchart illustrating an operating method of an electronic device according to an embodiment of the disclosure.

Referring to FIG. 15, according to various embodiments, in operation 1501, the electronic device 101 (e.g., the processor 120 in FIG. 1A) may identify that communication based on a second RAT by using a first SIM (e.g., the first SIM 111 in FIG. 1B) is executable. In operation 1503, the electronic device 101 may identify that communication based on the second RAT by using a second SIM (e.g., the second SIM 112 in FIG. 1B) is executable. In operation 1505, the electronic device 101 may compare data rate based on the first SIM 111 and data rate based on the second SIM 112.

For example, the electronic device 101 may refer to a table such as Table 1 below.

TABLE 1

| PLMN | cell Identity | Number Of SCell | SCell Index | EARFCN | Bandwidth | 4 × 4 MIMO | DL 256 QAM |
|---|---|---|---|---|---|---|---|
| 310-410 | 0x7F958D7 | 2 | PCell | 5330 | 20 | Yes | Yes |
|  |  |  | SCell 1 | 2175 | 10 | Yes | No |
|  |  |  | SCell2 | 900 | 10 | No | No |
| 310-410 | 0x7F12847 | 0 | PCell | 2050 | 15 | Yes | Yes |
| 313-100 | 0x3F33FCl | 1 | PCell | 5230 | 10 | No | Yes |
|  |  |  | SCell1 | 2100 | 10 | No | Yes |
| . . . | . . . | . . . | . . . | . . . | . . . | . . . | . . . |

Table 1 is a configured throughput table and may include information for each cell (e.g., the number of SCells, a SCell index, an e-utra absolute radio frequency channel number (EARFCN), whether a bandwidth multiple-input multiple-output (MIMO) is supported, and whether quadrature amplitude modulation (QAM) is supported). The electronic device 101 may identify information of a cell in which each of a plurality of SIMs is camped-on through a table like Table 1. The configured throughput table may store carrier aggregation, a bandwidth, MIMO, and information of QAM whenever the electronic device 101 connects RRC connection. The electronic device 101 may measure channel quality for each SIM and calculate a rank and a channel quality index (CQI). If a SCell exists in the configured throughput table, the electronic device 101 may calculate ranks and CQI with respect to each SCell and a PCell, or calculate a rank and CQI of a PCell and estimate a value of a SCell to be the same as the value of the PCell. In case that the value of the S cell is estimated as the same as that of the PCell, an NR-Arfcn field may not need to exist.

According to various embodiments, the electronic device 101 may identify a rank according to use of 4×4 MIMO in the configured throughput table. For example, the electronic device 101 may identify a maximum rank of 4 in case that 4×4 MIMO is used, and may identify a maximum rank of 2 in case that 4×4 MIMO is not used. The electronic device 101 may identify a CQI based on use of 256 QAM of downlink in the configured throughput table. For example, the electronic device 101 may identify a CQI based on CQI Table 1 including up to 64 QAM in case that 256 QAM is not used, and may identify CQI by using CQI cable 2 including up to 256 QAM in case that 256 QAM is used. The electronic device 101 may predict a data rate for each SIM based on, for example, Equation 1. Equation 1 may be defined by 3GPP TS $$\text{Equation 1}$$

data rate (in *Mbps*) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j)\cdot\mu} \cdot 12}{T_s^{\mu}} \cdot \left(1 - OH^{(j)}\right) \right)$$

In Equation 1, J may be the number of aggregated component carriers in a bend or a combination of bands. $R_{max}$ may be, for example, 948/1024. j may be a natural number, and with respect to a j-th component carrier (CC), $v_{Layers}^{(j)}$ may be a maximum number of supported layers obtained from a maximum value of higher layer parameter (maxNumberMIMO-LayersPDSCH) for downlink and higher layer parameter(maxNumberMIMO-LayersCB-PUSCH and maxNumberMIMO-LayersNonCB-PUSCH for uplink. $Q_m^{(j)}$ may be a maximum supported modulation order obtained from higher layer parameter(supported-ModulationOrderDL) for downlink and higher layer parameter(supportedModulationOrderUL) for uplink. $f^{(j)}$ may be a scaling factor obtained from higher layer parameter(scaling-Factor) and may be selected from among 1, 0.8, 0.75, and 0.4. μ may be numerology defined in 3GPP TS 38.211. $T_s^{\mu}$ may be an average OFDM symbol duration in a subframe with respect to numerology μ, that is $$T_s^{\mu} = \frac{10^{-3}}{14 \cdot 2^{\mu}}.$$

A normal cyclic prefix is used. $N_{PRB}^{BW(j)\cdot\mu}$ may be a maximum RB allocation within $BW^{(j)}$ a bandwidth with respect to numerology μ, and may be defined in, for example, 5.3 TS 38.101-1 [2] and 5.3 TS 38.101-2 [3]. $BW^{(j)}$ may be a UE supported maximum bandwidth in a given band or a combination of bands. $OH^{(j)}$ is overhead and selected from values in Table 2 below.

TABLE 2

| | |
|---|---|
| 0.14 | for frequency range FR1 for DL |
| 0.18 | for frequency range FR2 for DL |
| 0.08 | for frequency range FR1 for UL |
| 0.10 | for frequency range FR2 for UL |

According to various embodiments, in operation 1507, the electronic device 101 may select a SIM to use the second RAT based on a comparison result. The electronic device 101 may select a SIM that is expected to have a higher data rate. The electronic device 101 may connect (or allocate) or enable at least one PDU session related to the second RAT to a protocol stack corresponding to the selected SIM without selection from a user. Furthermore, the electronic device 101 may inquire a user whether to use a SIM that is expected to have a higher data rate, and when an additional command is received from the user, may connect (or allocate) or enable at least one PDU session related to the second RAT to a protocol stack corresponding to the selected SIM.

Figure 16:
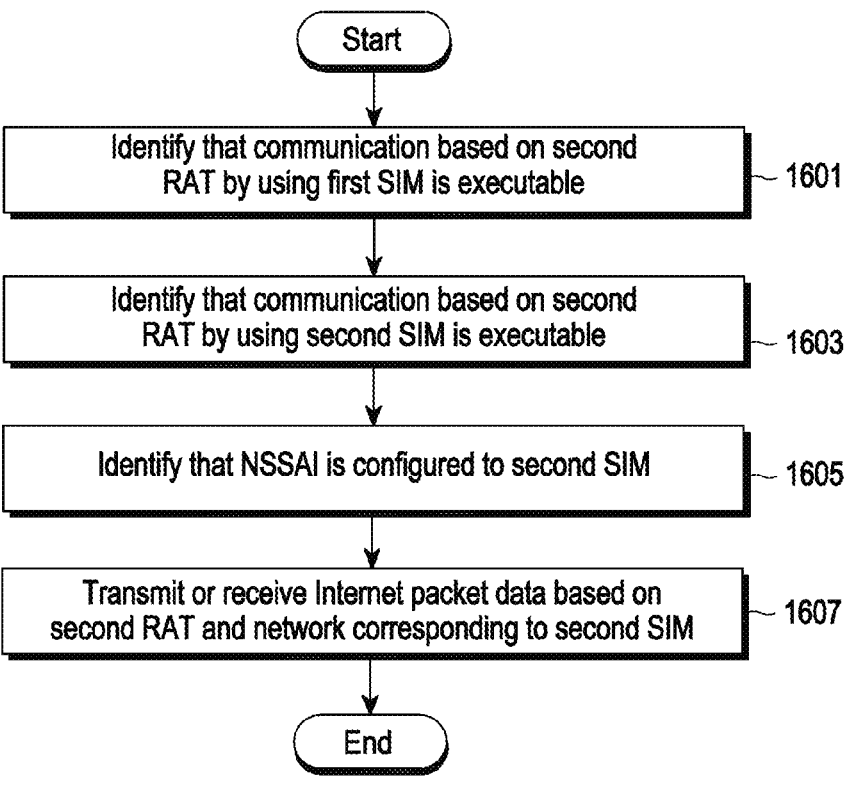
FIG. 16 is a flowchart illustrating an operating method of an electronic device according to an embodiment of the disclosure.

FIG. 16 is a flowchart illustrating an operating method of an electronic device according to an embodiment of the disclosure.

Referring to FIG. 16, according to various embodiments, in operation 1601, the electronic device 101 (e.g., the processor 120 in FIG. 1A) may identify that communication based on a second RAT by using a first SIM (e.g., the first SIM 111 in FIG. 1B) is executable. In operation 1603, the electronic device 101 may identify that communication based on the second RAT by using a second SIM (e.g., the second SIM 112 in FIG. 1B) is executable. In operation 1605, the electronic device 101 may identify that network slice selection assistance information (NSSAI) is configured to the second SIM 112.

For example, single-NSSAI (S-NSSAI) may be used for identifying a network slice. The S-NSSATI may include a Slice/Service type (SST) which may refer to the expected network slice behavior in terms of features and services and a Slice Differentiator (SD) which is optional information for complementing the Slice/Service type to differentiate multiple network slices of the same Slice/Service type. For example, an SST value of the eMBB may be 1, a SST value of the URLLC may be 2, and a SST value of the MIoT may be 3. The NSSAT may be a group of S-NSSAI. The NSSAI may be one of configured NSSAI, requested NSSAI or allowed NSSAI. Up to 8 S-NSSAI may exist in requested and allowed NSSAT which is transmitted in a signaling message between the electronic device 101 and a network. The NSSAI requested by the electronic device 101 to the network may allow the network to select a serving AMF, a network slice, and a network slice instance with respect to the electronic device 101. Information related to the network slice used by the electronic device 101 is as follows:

Configured NSSAI: is changed through pre-configured/ UE configured update,

Requested NSSAI: is included in Registration request msg and configured by UE,

Allowed NSSAI: is included in Registration accept msg and corresponds to s-NSSAIs allowable based on requested NSSAI, Rejected NSSAI: is included in Registration accept msg and valid only in PLMN or Registration area.

According to various embodiments, when a Configured NSSAI field value stored in a SIM exists, the electronic device 101 may identify the Configured NSSAI field value. Alternatively, the electronic device 101 may store a NSSAI value which is pre-configured or received for each PLMN in a previous network registration process, and may reuse the NS SAI value when rebooted. The electronic device 101 may identify whether NSSAI is stored (or configured) with respect to a specific SIM.

According to various embodiments, in operation 1607, the electronic device 101 may transmit or receive Internet packet data to or from the network corresponding to the second SIM 112, based on the second RAT. For example, when NSSAI is not configured to the first SIM 111, the electronic device 101 may transmit or receive packet data through the configured network slice based on the second RAT and the network corresponding to the second SIM 112 based on that NSSAI is configured to the second SIM 112. The electronic device 101 may connect (or allocate) or enable at least one PDU session related to the second RAT to a protocol stack corresponding to the selected SIM without selection from a user. Furthermore, the electronic device 101 may inquire whether to use a SIM that is expected to have a higher data rate, and when an additional command is received from the user, may connect (or allocate) or enable at least one PDU session related to the second RAT to a protocol stack corresponding to the selected SIM.

According to various embodiments, the electronic device 101 may select a SIM to use the second RAT based on a type of a 5G service. For example, it may be identified that a network slice that may be provided through the first SIM 111 is eMBB based on a NSSAI value and for the second SIM 112, eMBB and URLLC are supported. The electronic device 101 may configure the first SIM 111 for 5G function or mobile data configuration, and perform a 5G service operation through the first SIM 111. In case of the second SIM 112, through a current registered network after a network registration process is performed, the electronic device 101 may identify that a 5G service (e.g., ultra-reliable and low latency service) differentiated from the 5G service provided by the first SIM 111 is supportable. In addition, the electronic device 101 may determine that a differentiated 5G service (e.g., ultra-reliable and low latency service) is required for a current electronic device). The electronic device 101 may induce 5G function transition to the second SIM 112 by providing a user interface of a user pop-up according to a determination result. Alternatively, the electronic device 101 may perform an automatic transition operation to perform a 5G service through the second SIM 112 instead of the first SIM 111. A protocol operation according thereto may include an operation of disconnecting a PDU session related to 5G having been used by the first SIM 111 and connecting PDU sessions related to 5G to be used by the second SIM 112.

Figure 17:
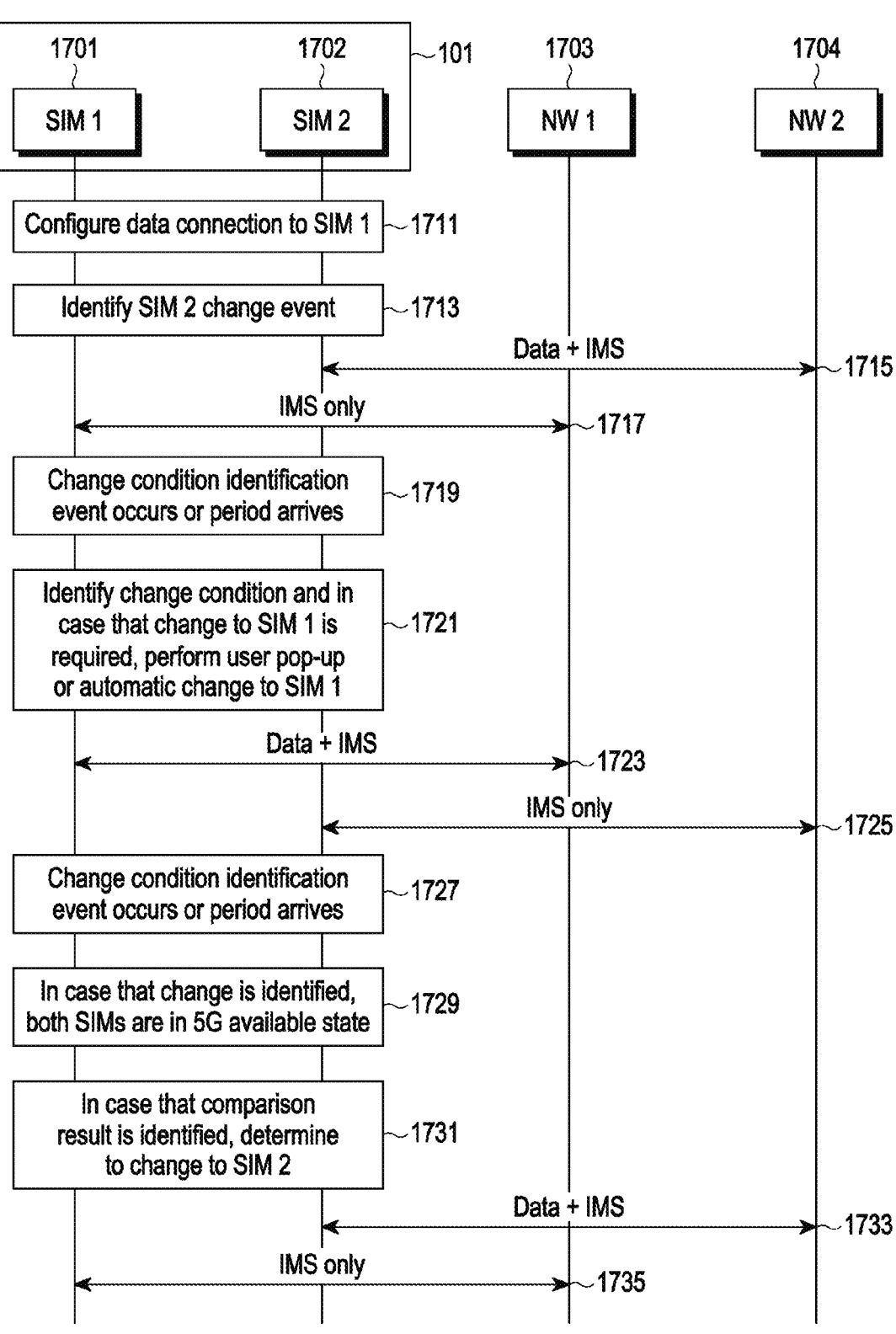
FIG. 17 is a signal flow diagram illustrating an operating method of an electronic device according to an embodiment of the disclosure.

FIG. 17 is a signal flow diagram illustrating an operating method of an electronic device according to an embodiment of the disclosure.

According to various embodiments, the electronic device 101 (e.g., the processor 120 in FIG. 1A) may be connected to a first SIM (e.g., the first SIM 111 in FIG. 1B) (e.g., LTE) and a second RAT (e.g., The second SIM 112 in FIG. 1B). A first network 1703 may be a network of a service provider of the first SIM 1701 and a second network 1704 may be a network of a service provider of the second SIM 1702. In operation 1711, the electronic device 101 may configure data connection to the first SIM 1701. For example, the electronic device 101 may connect (or allocate) an Internet PDN to a first protocol stack corresponding to the first SIM 1701 or enable an Internet PDN connected to the first protocol stack. The electronic device 101 may identify an event of changing to the second SIM 1702 in operation 1713.

According to various embodiments, based on the change event, the electronic device 101 may connect (or allocate) or enable a PDN and IMS PDN to a second protocol stack corresponding to the second SIM 1702 and connect (or allocate) or enable an IMS PDN to a first protocol stack corresponding to the first SIM 1701. According thereto, the electronic device 101 may transmit or receive Internet packet data and IMS packet data to or from the second network 1704 based on the second SIM 1702 in operation 1715, and transmit or receive IMS packet data to or from the first network 1703 based on the first SIM 1701 in operation 1717.

According to various embodiments, in operation 1719, the electronic device 101 may detect occurrence of a change condition event or identify that the change condition identification period arrives. When the change condition is identified in operation 1721 and change to the first SIM 1701 is required, the electronic device 101 may display a user pop-up or perform automatic change to the first SIM 1701. The electronic device 101 may connect (or allocate) or enable a PDN and IMS PDN to the first protocol stack corresponding to the first SIM 1701 and connect (or allocate) or enable an IMS PDN to the second protocol stack corresponding to the second SIM 1702. According thereto, the electronic device 101 may transmit or receive Internet packet data and IMS packet data to or from the first network 1703 based on the first SIM 1701 in operation 1723, and transmit or receive IMS packet data to or from the second network 1704 based on the second SIM 1702 in operation 1725.

According to various embodiments, in operation 1727, the electronic device 101 may detect occurrence of a change condition event or identify that the change condition identification period arrives. In operation 1729, when the change condition is identified, the electronic device 101 may identify a state in which 5G are available through both SIMs. In operation 1731, the electronic device 101 may determine to change to the second SIM 1702 based on a comparison result between both SIMs. For example, the electronic device 101 may determine to change to the second SIM 1702 based on a predicted data rate and/or whether NSSAI is configured, but without limitation thereto. The electronic device 101 may connect (or allocate) or enable a PDN and IMS PDN to the second protocol stack corresponding to the second SIM 1702 and connect (or allocate) or enable an IMS PDN to the first protocol stack corresponding to the first SIM 1701. According thereto, the electronic device 101 may transmit or receive Internet packet data and IMS packet data to or from the second network 1704 based on the second SIM 1702 in operation 1733, and transmit or receive IMS packet data to or from the first network 1703 based on the first SIM 1701 in operation 1735.

According to various embodiments, an electronic device 101 may include at least one processor (e.g., the processor 120), wherein the at least one processor (e.g., the processor 120) is configured to, by using a first SIM among a plurality of SIMs connected to the at least one processor (e.g., the processor 120), transmit or receive Internet packet data to or from a first network corresponding to the first SIM, based on a first RAT and; when a second SIM among the plurality of SIMs supports a second RAT different from the first RAT, identify whether communication based on a second RAT with a second network corresponding to the second SIM is executable during transmission or reception of the Internet packet data to or from the first network; and based on identifying that communication based on the second RAT with the second network corresponding to the second SIM is executable, transmit or receive the Internet packet data to or from the second network corresponding to the second SIM, based on the second RAT.

According to various embodiments, the at least one processor (e.g., the processor 120) may be configured to, during transmission or reception of Internet packet data to or from the first network corresponding to the first SIM based on the first RAT, additionally transmit or receive IMS packet data to or from the first network, based on the first RAT and transmit or receive the IMS packet data to or from at least one network corresponding to the second SIM.

According to various embodiments, the at least one processor (e.g., the processor 120) may be configured to, during transmission or reception of the Internet packet data to or from the second network corresponding to the second SIM, based on the second RAT, transmit or receive IMS packet data to or from the first network, based on the first RAT and additionally transmit or receive the IMS packet data to or from the second network corresponding to the second SIM.

According to various embodiments, the at least one processor (e.g., the processor 120) may be configured to connect an Internet PDN to a first protocol stack corresponding to the first SIM or enable the Internet PDN connected to the first protocol stack as at least a portion of the operation of transmitting or receiving the Internet packet data to or from the first network corresponding to the first SIM, based on the first RAT, and connect the Internet PDN to a second protocol stack corresponding to the second SIM or enable the Internet PDN connected to the second protocol stack as at least a portion of the operation of transmitting or receiving the Internet packet data to from the second network corresponding to the second SIM, based on the second RAT.

According to various embodiments, the at least one processor (e.g., the processor 120) may be configured to, as at least a portion of the operation of transmitting or receiving the Internet packet data to or from the second network corresponding to the second SIM, based on the second RAT, based on identifying that communication based on the second RAT with the second network corresponding to the second SIM is executable, output a message inquiring change to the second SIM, and in case that a user command corresponding to the output message is received, transmit or receive the Internet packet data to or from the second network corresponding to the second SIM based on the second RAT.

According to various embodiments, the at least one processor (e.g., the processor 120) may be configured to, as at least a portion of the operation of identifying whether communication based on the second RAT with the second network corresponding to the second SIM is executable, receive system information from a network corresponding to the second SIM, and based on whether upperlayer indication is included in the system information, identify whether communication based on the second RAT with the second network corresponding to the second SIM is executable.

According to various embodiments, the at least one processor (e.g., the processor 120) may be configured to, as at least a portion of the operation of identifying whether communication based on the second RAT with the second network corresponding to the second SIM is executable, receive system information from a network corresponding to the second SIM, and based on whether information about a neighbor cell corresponding to the second RAT is included in the system information, identify whether communication based on the second RAT with the second network corresponding to the second SIM is executable.

According to various embodiments, the at least one processor (e.g., the processor 120) may be configured to, based on whether information about a neighbor cell corresponding to the second RAT is included in the system information, as at least a portion of the operation of identifying whether communication based on the second RAT with the second network corresponding to the second SIM is executable, based on whether a measurement result with respect to at least one of a reference signal or a synchronization signal from the neighbor cell satisfies a predetermined condition, identify whether communication based on the second RAT with the second network corresponding to the second SIM is executable.

According to various embodiments, the at least one processor (e.g., the processor 120) may be configured to, as at least a portion of the operation of identifying whether communication based on the second RAT with the second network corresponding to the second SIM is executable, based on whether a measurement result with respect to a frequency related to the second RAT satisfies a predetermined condition, identify whether communication based on the second RAT with the second network corresponding to the second SIM is executable.

According to various embodiments, the at least one processor (e.g., the processor 120) may be configured to, as at least a portion of the operation of identifying whether communication based on the second RAT with the second network corresponding to the second SIM is executable, receive at least one of an Attach accept message or a TAU accept message from a network corresponding to the second SIM, and based on a DCNR value included in at least one of the Attach accept message or the TAU accept message, identify whether communication based on the second RAT with the second network corresponding to the second SIM is executable.

According to various embodiments, the at least one processor (e.g., the processor 120) may be configured to, as at least a portion of the operation of identifying whether communication based on the second RAT with the second network corresponding to the second SIM is executable, identify a current location of the electronic device 101, and based on whether a history of communication based on the second RAT by using the second SIM exists, identify whether communication based on the second RAT with the second network corresponding to the second SIM is executable.

According to various embodiments, the at least one processor (e.g., the processor 120) may be configured to, based on at least one of information stored in the second SIM, information about hardware of the electronic device 101, or information identified from software stored in the electronic device 101, identify whether the second SIM supports the second RAT.

According to various embodiments, an electronic device 101 may include at least one processor (e.g., the processor 120), wherein the at least one processor (e.g., the processor 120) is configured to identify that a first SIM among a plurality of SIMs connected to the at least one processor (e.g., the processor 120) supports a first RAT and a second RAT, identify that a second SIM among the plurality of SIMs connected to the at least one processor (e.g., the processor 120) supports the first RAT and the second RAT, select a SIM from among the first SIM and the second SIM for performing communication based on the second RAT, and transmit or receive data related to the second RAT to or from a network corresponding to the selected SIM, based on the second RAT.

According to various embodiments, the at least one processor (e.g., the processor 120) may be configured to, as at least a portion of the operation of transmitting or receiving data related to the second RAT to or from a network corresponding to the selected SIM, based on the second RAT, transmit or receive at least one of Internet packet data, data related to an enhanced mobile broadband (eMBB), data related to ultra-reliable low latency communication (URLLC), data related to massive machine type communication (mMTC), or data for an application configured to provide a 5G service.

According to various embodiments, the at least one processor (e.g., the processor 120) may be configured to, as at least a portion of the operation of transmitting or receiving data related to the second RAT to or from a network corresponding to the selected SIM, based on the second RAT, connect at least one of sessions for Internet PDN, a PDU session for an eMBB, a PDU session for URLLC, a PDU session for mMTC, or a PDU session for an application configured to provide a 5G service to a protocol stack corresponding to the selected SIM, or enable a session connected to the protocol stack corresponding to the selected SIM.

According to various embodiments, the at least one processor (e.g., the processor 120) may be configured to, as at least a portion of the operation of selecting a SIM from among the first SIM and the second SIM for performing communication based on the second RAT, based on a user input, select a SIM for performing communication based on the second RAT.

According to various embodiments, the at least one processor (e.g., the processor 120) may be configured to, as at least a portion of the operation of selecting a SIM from among the first SIM and the second SIM for performing communication based on the second RAT, identify a first data rate based on the first SIM and a second data rate based on the second SIM, and based on a result of comparison between the first data rate and the second data rate, select a SIM for performing communication based on the second RAT.

According to various embodiments, the at least one processor (e.g., the processor 120) may be configured to, as at least a portion of the operation of selecting a SIM from among the first SIM and the second SIM for performing communication based on the second RAT, identify at least one first NSSAI configured with respect to the first SIM and at least one second NSSAI configured with respect to the second SIM, and based on comparison between the at least one first NSSAI and the at least one second NSSAI, select a SIM for performing communication based on the second RAT.

According to various embodiments, the at least one processor (e.g., the processor 120) may be configured to, as at least a portion of the operation of selecting a SIM from among the first SIM and the second SIM for performing communication based on the second RAT, select the SIM to which NSSAI is configured as a SIM for performing communication based on the second RAT.

According to various embodiments, an operating method of an electronic device 101 may include an operation of, by using a first SIM among a plurality of SIMs connected to at least one processor (e.g., the processor 120) of the electronic device 101, transmitting or receiving Internet packet data to or from a first network corresponding to the first SIM, based on a first RAT, when a second SIM among the plurality of SIMs supports a second RAT different from the first RAT, an operation of identifying whether communication based on a second RAT with a second network corresponding to the second SIM is executable during transmission or reception of the Internet packet data to or from the first network, and based identifying that communication based on the second RAT with the second network corresponding to the second SIM is executable, an operation of transmitting or receiving the Internet packet data to or from the second network corresponding to the second SIM, based on the second RAT.

According to various embodiments, the operation of transmitting or receiving the Internet packet data to or from the second network corresponding to the second SIM, based on the second RAT may include, based on identifying that communication based on the second RAT with the second network corresponding to the second SIM is executable, an operation of outputting a message inquiring change to the second SIM, and in case that a user command corresponding to the output message is received, an operation of transmitting or receiving the Internet packet data to or from the second network corresponding to the second SIM based on the second RAT.

According to various embodiments, the operating method may further include, based on at least one of information stored in the second SIM, information about hardware of the electronic device 101, or information identified from software stored in the electronic device 101, an operation of identifying whether the second SIM supports the second RAT.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one processor, and
memory, wherein the memory stores instructions that, when executed by the at least one processor, cause the electronic device to:
based on a user selection, allocate Internet protocol (IP) multimedia subsystem (IMS) packet data network (PDN) and Internet PDN to a first subscriber identity module (SIM) to transmit and receive, IMS data and/or Internet packet data using the first SIM based on a first radio access technology (RAT), and allocate the IMS PDN to a second SIM,
determine whether communication, using the first SIM and the second SIM, based on a second RAT is available while the IMS PDN and the Internet PDN is allocated to the first SIM and the IMS PDN is allocated to the second SIM,
based on a result of the determination, compare a first expected data rate for the Internet packet data transmitted or received using the first SIM based on the first RAT and a second expected data rate for the Internet packet data transmitted or received using the second SIM based on the second RAT,
based on a result of the comparison, select the second SIM for transmitting or receiving Internet packet data from the first SIM and the second SIM,
based on selection of the second SIM, output a message inquiring change to the second SIM, and
in response to receiving a user command corresponding to the message;
release allocation of the Internet PDN to the first SIM while maintaining allocation of the IMS PDN to the first SIM, and
allocate Internet PDN to the second SIM to transmit and receive the Internet packet data, based on the second RAT.

2. The electronic device of claim 1, wherein the instructions, when executed by the at least one processor, further cause the electronic device to:
during transmission or reception of Internet packet data to or from a first network corresponding to the first SIM, based on the first RAT, transmit or receive IMS packet data to or from the first network, based on the first RAT, and
transmit or receive the IMS packet data to or from at least one network corresponding to the second SIM,
wherein the first RAT includes at least one of global system for mobile communications (GSM), wideband code division multiple access (WCDMA), or long-term evolution (LTE).

3. The electronic device of claim 2, wherein the instructions, when executed by the at least one processor, further cause the electronic device to:
during transmission or reception of the Internet packet data to or from a second network corresponding to the second SIM, based on the second RAT, transmit or receive IMS packet data to or from the first network, based on the first RAT, and
transmit or receive the IMS packet data to or from the second network corresponding to the second SIM, wherein the second RAT includes new radio (NR).

4. The electronic device of claim 1, wherein the instructions, when executed by the at least one processor, further cause the electronic device to:

connect an Internet PDN to a first protocol stack corresponding to the first SIM or enable the Internet PDN connected to the first protocol stack, and as at least a portion of the transmitting or receiving the Internet packet data to or from a second network corresponding to the second SIM, based on a second RAT, connect the Internet PDN to a second protocol stack corresponding to the second SIM or enable the Internet PDN connected to the second protocol stack.

5. The electronic device of claim 1, wherein the instructions, when executed by the at least one processor, further cause the electronic device to:

receive system information from a network corresponding to the second SIM, and based on whether upperlayer indication is included in the system information, identify whether communication based on the second RAT with a second network corresponding to the second SIM is executable.

6. The electronic device of claim 1, wherein the instructions, when executed by the at least one processor, further cause the electronic device to:

receive system information from a network corresponding to the second SIM, and based on whether information about a neighbor cell corresponding to the second RAT is included in the system information, identify whether communication based on the second RAT with a second network corresponding to the second SIM is executable.

7. The electronic device of claim 6, wherein the instructions, when executed by the at least one processor, further cause the electronic device to:

based on whether a measurement result with respect to at least one of a reference signal or a synchronization signal from the neighbor cell satisfies a predetermined condition, identify whether communication based on the second RAT with the second network corresponding to the second SIM is executable.

8. The electronic device of claim 1, wherein the instructions, when executed by the at least one processor, further cause the electronic device to: ;

based on whether a measurement result with respect to a frequency related to the second RAT satisfies a predetermined condition, identify whether communication based on the second RAT with a second network corresponding to the second SIM is executable.

9. The electronic device of claim 1, wherein the instructions, when executed by the at least one processor, further cause the electronic device to:

receive at least one of an Attach accept message or a tracking area update accept (TAU) accept message from a second network corresponding to the second SIM, and based on a dual-connectivity with new radio (DCNR) value included in at least one of the Attach accept message or the TAU accept message, identify whether communication based on the second RAT with the second network corresponding to the second SIM is executable.

10. The electronic device of claim 1, wherein the instructions, when executed by the at least one processor, further cause the electronic device to:

identify a current location of the electronic device,; and based on whether a history of communication based on the second RAT by using the second SIM exists, identify whether communication based on the second RAT with a second network corresponding to the second SIM is executable.

11. The electronic device of claim 1, wherein the instructions, when executed by the at least one processor, further cause the electronic device to, based on at least one of information stored in the second SIM, information about hardware of the electronic device, or information identified from software stored in the electronic device, identify whether the second SIM supports the second RAT.

12. A non-transitory storage medium storing one or more programs, the one or more programs comprising computer-executable instructions, when executed by at least one processor of an electronic device, cause the electronic device to:

based on a user selection, allocate Internet protocol (IP) multimedia subsystem (IMS) packet data network (PDN) and Internet PDN to a first subscriber identity module (SIM) to transmit and receive, IMS data and/or Internet packet data using the first SIM based on a first radio access technology (RAT), and allocate the IMS PDN to a second SIM, determine whether communication, using the first SIM and a-the second SIM, based on a second RAT is available while the IMS PDN and the Internet PDN is allocated to the first SIM and the IMS PDN is allocated to the second SIM, based on a result of the determination, compare a first expected data rate for the Internet packet data transmitted or received using the first SIM based on the first RAT and a second expected data rate for the Internet packet data transmitted or received using the second SIM based on the second RAT, based on a result of the comparison, select the second SIM for transmitting or receiving Internet packet data from the first SIM and the second SIM, based on selection of the second SIM, output a message inquiring change to the second SIM, and in response to receiving a user command corresponding to the message;

release allocation of the Internet PDN to the first SIM while maintaining allocation of the IMS PDN to the first SIM, and allocate Internet PDN to the second SIM to transmit and receive data, using the second SIM, based on the second RAT.

13. The non-transitory storage medium of claim 12, wherein the instructions, when executed by the at least one processor of the electronic device, further cause the electronic device to:

during transmission or reception of Internet packet data to or from a first network corresponding to the first SIM, based on an RAT, transmit or receive IMS packet data to or from the first network, based on the first RAT, and transmit or receive the IMS packet data to or from at least one network corresponding to the second SIM, wherein the first RAT includes at least one of global system for mobile communications (GSM), wideband code division multiple access (WCDMA), or long-term evolution (LTE).

14. The non-transitory storage medium of claim 12, wherein the instructions, when executed by the at least one processor of the electronic device, further cause the electronic device to:

during transmission or reception of Internet packet data to or from a second network corresponding to the second SIM, based on the a second RAT, transmit or receive IMS packet data to or from a first network, based on the first RAT, and transmit or receive the IMS packet data to or from the second network corresponding to the second SIM, wherein the second RAT includes new radio (NR).

15. The non-transitory storage medium of claim 12, wherein the instructions, when executed by the at least one processor of the electronic device, further cause the electronic device to:

connect an Internet PDN to a first protocol stack corresponding to the first SIM or enable the Internet PDN connected to the first protocol stack, and connect the Internet PDN to a second protocol stack corresponding to the second SIM or enable the Internet PDN connected to the second protocol stack.

16. The non-transitory storage medium of claim 12, wherein the instructions, when executed by the at least one processor of the electronic device, further cause the electronic device to:

receive system information from a network corresponding to the second SIM, and based on whether upperlayer indication is included in the system information, identify whether communication based on a second RAT with a second network corresponding to the second SIM is executable.

17. The non-transitory storage medium of claim 12, wherein the instructions, when executed by the at least one processor of the electronic device, further cause the electronic device to:

receive system information from a network corresponding to the second SIM, and based on whether information about a neighbor cell corresponding to the second RAT is included in the system information, identify whether communication based on a second RAT with a second network corresponding to the second SIM is executable.

18. The non-transitory storage medium of claim 12, wherein the instructions, when executed by the at least one processor of the electronic device, further cause the electronic device to:

based on whether a measurement result with respect to a frequency related to a second RAT satisfies a predetermined condition, identify whether communication based on the second RAT with a second network corresponding to the second SIM is executable.

* * * * *